July 30, 1963 D. G. TUCKER ETAL 3,099,833

METHOD OF RADIO SCANNING

Filed March 17, 1959 14 Sheets-Sheet 1

INVENTORS.
David Gordon Tucker
David Evan Naunton Davies

BY

Ward, Neal, Haselton, Orme & McElhannon.
ATTORNEYS.

July 30, 1963 D. G. TUCKER ETAL 3,099,833

METHOD OF RADIO SCANNING

Filed March 17, 1959 14 Sheets-Sheet 2

INVENTORS.
David Gordon Tucker.
David Evan Naunton Davies

BY
Ward, Neal, Haselton, Orme & McElhannon
ATTORNEYS.

July 30, 1963 D. G. TUCKER ETAL 3,099,833

METHOD OF RADIO SCANNING

Filed March 17, 1959 14 Sheets-Sheet 3

INVENTORS.
David Gordon Tucker
David Evan Naunton Davies

BY
Ward, Neal, Haselton, Orme & McElhannon
ATTORNEYS

July 30, 1963 D. G. TUCKER ETAL 3,099,833

METHOD OF RADIO SCANNING

Filed March 17, 1959 14 Sheets-Sheet 4

INVENTORS.
David Gordon Tucker.
David Evan Naunton Davies
BY
Ward, Neal, Haselton, Orme & McElhannon.
ATTORNEYS.

METHOD OF RADIO SCANNING

Filed March 17, 1959 14 Sheets-Sheet 5

INVENTORS.
David Gordon Tucker.
David Evan Naunton Davies
BY

Ward, Neal, Haselton, Orme & McElhannon
ATTORNEYS.

METHOD OF RADIO SCANNING

Filed March 17, 1959 14 Sheets-Sheet 6

INVENTORS
David Gordon Tucker
David Evan Naunton Davies
BY
Ward, Neal, Haselton, Orme & McElhannon
ATTORNEYS INVENTORS.
David Gordon Tucker
David Evan Naunton Davies
BY
Ward, Neal, Haselton, Orme & McElhannon
ATTORNEY INVENTORS.
David Gordon Tucker.
David Evan Naunton Davies
BY
Ward, Neal, Haselton, Orme & McElhannon
ATTORNEYS July 30, 1963 D. G. TUCKER ET AL 3,099,833

METHOD OF RADIO SCANNING

Filed March 17, 1959 14 Sheets-Sheet 9

EACH RECTANGLE REPRESENTS ONE SCAN OR PERIOD OF THE FREQUENCY MODULATION.

INVENTORS.
David Gordon Tucker
David Evan Naunton Davies
BY
Ward, Neal, Haselton, Orme & McElhannon.
ATTORNEYS.

INVENTORS.
David Gordon Tucker.
David Evan Naunton Davies

BY

Ward, Neal, Haselton, Orme & McElhannon.
ATTORNEYS.

INVENTORS.
David Gordon Tucker.
David Evan Naunton Davies.
BY
Ward, Neal, Haselton, Orme & McElhannon
ATTORNEYS.

METHOD OF RADIO SCANNING

Filed March 17, 1959 14 Sheets-Sheet 12

INVENTORS.
David Gordon Tucker,
David Evan Naunton Davies

BY

Ward, Neal, Haselton, Orme & McElhannon
ATTORNEYS.

July 30, 1963 D. G. TUCKER ETAL 3,099,833

METHOD OF RADIO SCANNING

Filed March 17, 1959 14 Sheets-Sheet 13

INVENTORS.
David Gordon Tucker.
David Evan Naunton Davies
BY
Ward, Neal, Haselton, Orme & McElhannon
ATTORNEYS

FORM OF FRAME SCAN FOR ONE SWEEP OF LOCAL OSCILLATOR

INVENTORS.
David Gordon Tucker
David Evan Naunton Davies
BY
Ward, Neal, Haselton, Orme & McElhannon
ATTORNEYS United States Patent Office 3,099,833
Patented July 30, 1963

3,099,833
METHOD OF RADIO SCANNING

David Gordon Tucker, Barnt Green, England, and David Evan Naunton Davies, Whitchurch, Cardiff, Wales, assignors to National Research Development Corporation, London, England, a British corporation Filed Mar. 17, 1959, Ser. No. 799,918
Claims priority, application Great Britain Mar. 17, 1958
23 Claims. (Cl. 343—16)

This invention relates to a method of and apparatus for producing scanning by a radio beam of a space to be explored.

Such scanning may be performed as part of a position finding method (as in the determination of one or more positional co-ordinates of an object—herein referred to as a target—in the scanned space) or as part of a method directed to some other purpose (such as the reception of intelligence as to happenings in the scanned space detectable by means of a radio beam).

The term "beam" used herein in relation to an antenna array denotes that such an array has a sensitivity which varies within a reference plane in such a manner that the sensitivity is a maximum in a particular direction, conveniently defined by a reference axis in such plane, and which reduces to zero or a minimum value at positions spaced angularly from such reference axis there being one or more such positions on each side thereof.

Since in general the beam is of smaller angular width than the angular width of the space sector to be explored, information (which term is to be deemed to include positional data, intelligence as to happenings in the scanned space, or any other kind of information detectable by means of a radio beam) which may be required to be gathered from the space to be explored, can, at any given instant, be obtained only in respect of some target or happening producing a signal incident from a direction within the beam width. If the presence of the target or continuance of the happening is transitory there is inherently the possibility of the information being lost through failure to direct the beam in the direction from which the signal is incident at the appropriate time, that is to say, during incidents of the signal.

Generally stated the condition for avoidance of loss of information through this cause is that scanning of the space to be explored (that is traverse from one boundary to the other boundary of the space) shall be performed within the time interval not greater than the period of the shortest signal which must be received to convey all the information.

Expressed in terms of frequency the scanning frequency must be not less than the modulation frequency of this signal.

In some cases the signal conveying the information is a pulse (ideally of square wave form). In the case of the ideal square wave-form the signal will in fact contain a fundamental component of sine wave form and of frequency corresponding to the pulse repetition frequency and harmonics of the second and higher orders. A practical lower limit for the scanning frequency, however, which will avoid loss of information to a significant extent is that corresponding to the duration of the pulse itself, that is to say, the reciprocal of pulse duration.

One object of the invention is to provide a new or improved form of scanning means for scanning the beam of a receiver antenna array.

Primarily the scanning means is applicable to radar apparatus including a transmitter for emitting a series of time-spaced radio pulses through a target containing medium, a receiver having a beam-forming antenna array incorporating spaced apart antenna elements connected with respective signal channels, a display device having co-related time base means defining co-ordinates of a sector of the medium to be explored, and amplifier means wherein signals in said channels are combined and are fed to said display device.

The term "spaced apart" used herein as applicable to antenna elements whether forming part of a receiver or transmitter array is intended to refer to the spacing between centres of the areas over which reception or radiation of the radio signal takes place in respect of adjacent antenna elements and is thus to be deemed to include arrays wherein structural parts constituting respective antenna elements are separated by a gap from each other, are contiguous with each other, overlap with each other, or are constituted by parts of a continuous receiving or radiating aperture or member.

In the description hereinafter set forth in relation to the drawings specific embodiments of the invention are disclosed, but for the purpose of explaining certain subsidiary objects of the invention concerned primarily with the elimination or reduction of forms of distortion which may arise, the broad character of radar apparatus in accordance with the invention is stated to comprise, in combination, means for generating a local electrical signal, modulator means in each of said channels connected operatively with said generating means and fed with said local signal to modulate incoming signals in said channels respectively, phase-shift elements operatively connected with said channels and so co-relating the relative phases of the modulated signals therein as to determine the position of the beam of said receiver antenna array in relation to a reference axis thereof, said phase-shaft elements being responsive to variation of said local signal, to vary differentially and in co-ordinated relation the respective phase-shifts imparted to said modulated signals and so deflect said beam in relation to said reference axis, and means for repeatedly varying said local signal within a time interval equal to that of said pulses, to cause said beam to scan a sector at least once within said time interval.

The phase-shift elements may have phase-shift characteristics variable as a function of frequency, the means for generating a local electrical signal being local oscillator producing an output of a frequency differing from the carrier of the incoming signals in said channels, and said local oscillator including means for cyclically varying the frequency of said output within a time interval equal to that of said pulses. The phase-shift elements may be connected in the signal channels respectively between the modulator means and the amplifier means.

A further object of the invention is to reduce to a minimum certain types of distortion which may arise in the signal which consists of the combined signals passing down several channels. Certain types of distortion may reduce the amplitude of the combined signal and modify the shape of its pulse envelope thus rendering the combined signal less satisfactory for display purposes by reducing the signal to noise level at the display and possibly impairing range discrimination. The further effect of distortion, however, is that the beam of the receiver antena array may not be properly formed, or at any given instance may occupy an angular position other than the calculated position (with which time base means in the display device will be co-ordinated) and from these causes there may thus be a reduction in gain of the receiver antenna array and directional inaccuracy.

Broadly, such distortion of the combined signal may occur (in a scanning means employing frequency sensitive phase-shift elements), firstly because of the presence of a phase-shift term in the modulated signals passing down the several channels which is not a linear or other predetermined function of frequency-shift of the locally generated signal, but is a function of the channel position (i.e. is dependent upon the number of sections of a delay line or total effective length of the phase-shift elements traversed by the modulated signal in each channel).

Secondly, two types of distortion of the combined signal may occur through the subjection of the respective signals in the several channels to differential time delays (as between the pulse envelopes of these signals) before they are combined with each other.

One such time delay inevitably occurs in the phase-shift elements themselves. Where the phase-shift elements are constituted by sections of a delay line, from which output is taken from one end to form the combined signal, it will be evident that as one proceeds towards the opposite end of the delay line channels connected to successive tapping points on the delay line will incorporate a progressively increasing length of the delay line, and consequently signals in these channels will be delayed by different amounts before reaching the output end of the delay line. Consequently the wave front of the combined signal may have a generally stepped form instead of a steeply rising form, each step being formed by the contribution made to the combined signal by the individual signals passing down the channels and the delay line.

Time delay as between respective signals may also occur in the target containing medium itself due to the oblique relation which will exist between a wave front incident at the receiving antenna array and the plane of the array itself when signals are received from any target which does not lie on a reference axis of the array perpendicular to the plane thereof. Such differential time delays may either aggravate those referred to in the last paragraph or compensate them (wholly or to a maximum extent at only one angle of incidence and partially or to a lesser extent at other angles of incidence) according to whether the target lies on one side or the other of the reference axis.

Delay in the phase-shift elements also produces a differential delay between groups of modulated signals (each group corresponding to one frequency sweep of the locally generated signal and hence also to one scanning motion of the beam across the sector to be scanned). Since the formation of the receiver beam depends upon combination of modulated signals in each channel and contained in one of the groups aforesaid only with modulated signals contained in corresponding groups in the other channels (i.e. pertaining to the same sweep of the locally generated signal and the same beam scan) the time staggered relation which will inevitably exist between these groups means that proper combination will take place only in a central portion of each group where this completely overlaps in time with all the other groups, and there will be regions at the end of each group in which signals from one group combine with those of a group pertaining to a preceding local oscillator sweep or beam scan and to a succeeding local oscillator sweep or beam scan.

Since in general a signal will not be received over an entire sector of the beam scan this effect does not manifest itself by the actual presence of a continuous modulated signal at the point of combination (e.g. at the output end of a delay line), but nevertheless the local signal is continuously generated and continuously swept in frequency, so that potentially the improper combination of signals in the end regions of each group can occur whenever a target producing signal reflection is present in the lateral margins of the scanned sector, and within these margins the distortion manifests itself as a malformation of the receiver beam.

Further features of the invention as hereinafter more fully described with reference to the drawings, are based upon perception of these causes of possible signal distortion and have for their object the provision of means for avoiding or reducing these forms of distortion.

Yet another object of the invention is to provide a beam forming antenna array and feeder system therefor, which without substantial loss of directional gain permits of the reception (or transmission) of signals from more than one direction simultaneously. Otherwise stated this object is to enable a beam forming array incorporating a plurality of antenna elements, hitherto regarded as capable of producing a beam in a single direction, to be so utilized as to furnish beams, which are not substantially reduced in directional gain, simultaneously in each of two or more directions. Such signals may then be received and displayed or otherwise used to provide increased information for a given scanning rate applied to said beams, or to reduce the scanning rate necessary to receive the same information. As a possible alternative signals received due to the beams may be combined with each other to improve the signal-to-noise ratio.

A further object of the invention is to provide a new or improved means for irradiating or "illuminating" the sector to be explored with a series of time-spaced radio pulses, such means permitting of an improvement in the ratio of signal strength at a given position in the sector to peak power of the transmitting means. Further, such means may permit of the "illumination" of any point within the sector by a pulse having a length substantially shorter than that actually radiated by the transmitting means thereby reducing the practical problems involved in achieving short pulse "illumination" of targets so far as generation of the pulses themselves are concerned.

The arrangements hereinbefore described in accordance with the invention are applicable both to scanning in a single plane (utilising a fan-shaped beam) and to scanning in two transverse planes, which for example may be mutually perpendicular to each other (in this case preferably utilising a pencil-shaped beam). A further object of the invention is to provide a new or improved form of scanning means based on the concepts hereinbefore set forth and applicable to this last mentioned purpose.

The invention will now be described by way of example with reference to the accompanying drawings illustrating embodiments thereof and wherein.

Figure 1:
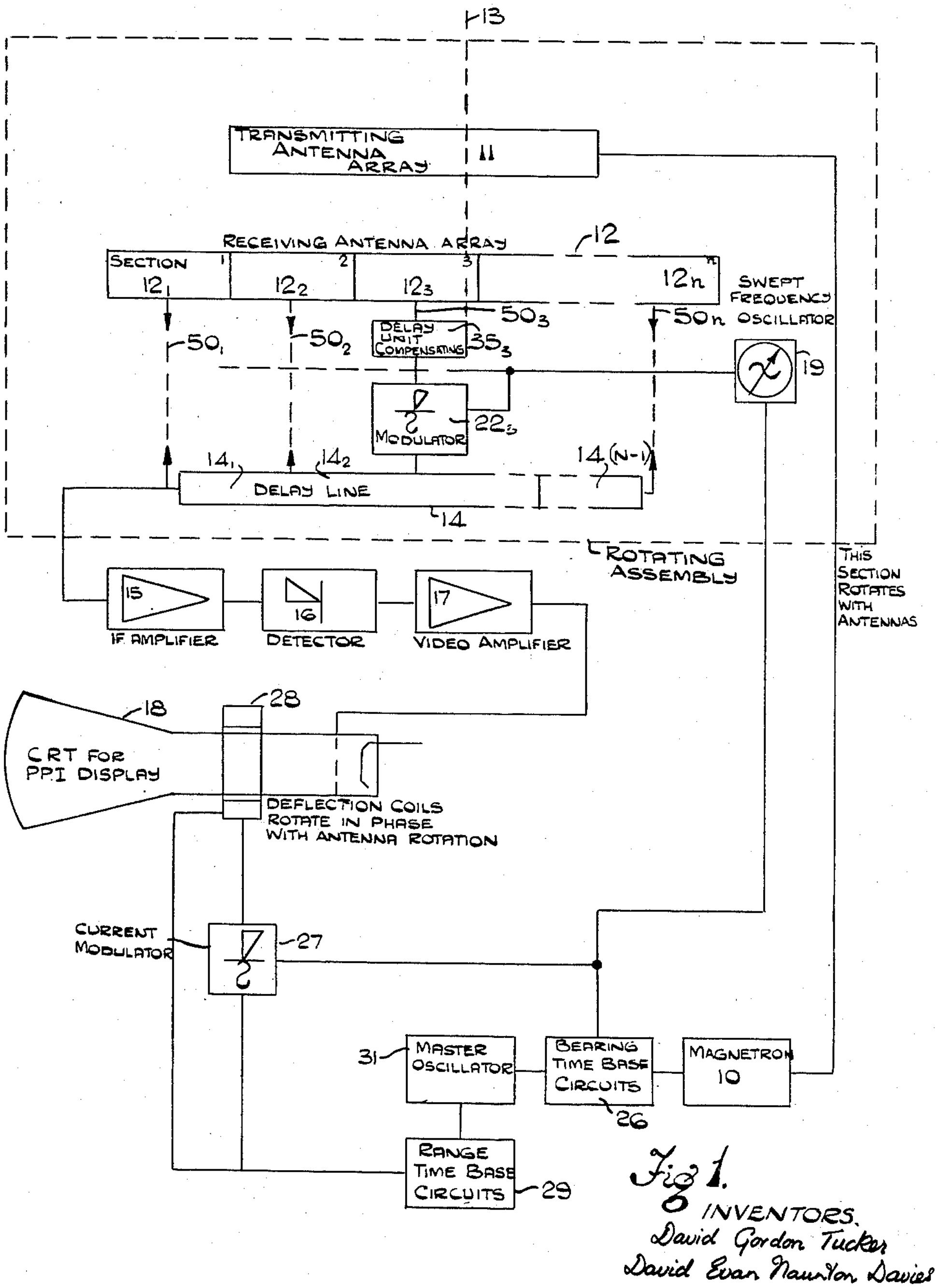
FIGURE 1 is a schematic diagram showing one form of position finding radar apparatus in accordance with the invention.

Referring firstly to FIGURE 1, the apparatus comprises a radio transmitter providing short steep fronted pulses of radiation separated by comparatively long intervals when there is no radiation. The transmitter may operate on centimetric wave lengths typically 3 centimetres (the carrier frequency of transmission being thus 10,000 megacycles), and its output is fed into suitable transmitting aerial array 11. The array 11 may be beam-forming, the width of the beam being such as to provide uniform or approximately uniform field strength within the angular limits of the sector explored by the high frequency scan (hereinafter described) of the beam of the receiving array. The transmitting array of a known type, for example a "cheese" reflector fed by a wave guide from the magnetron transmitter, may be used or alternatively the transmitter and its array may be as hereinafter described in greater detail with reference to FIGURES 19 and 20.

The pulse duration (or the effective pulse duration of the system shown in FIGURES 19 and 20) of the signal emitted may be 1.0 microsecond or less. In general range discrimination is improved by the use of pulses which are as short as possible, but in practice the generation of pulses of less than 0.1 microsecond is difficult and also the factor of pulse distortion from the causes previously mentioned has to be considered.

The receiver means of the apparatus which is adapted to receive the emitted pulses as reflections from a target comprises a beam-forming receiving antenna array 12 which may be of the strip type, that is to say, consisting of a plurality of separate receiving elements indicated at $\mathbf{12}_1$, $\mathbf{12}_2$, $\mathbf{12}_3$, $\mathbf{12}_n$, the number, *n*, of separate elements used in any given case being determined by the angular limits of the sector to be explored, by the high frequency scan and by the number of separate channels, and hence the degree of complication, which can in any particular case be accepted in the receiving means.

The elements $\mathbf{12}_1$–$\mathbf{12}_n$ are spaced from each other in a direction parallel to the plane in which high frequency scanning is required to take place and for convenience in the following description this will be taken to be the horizontal plane, but it will of course be understood that similar arrangements would be adopted were it required to perform the high frequency scan in any other plane, for example, the vertical plane.

The beam produced by the array $\mathbf{12}_1$–$\mathbf{12}_n$ will normally be coincident with a reference axis indicated by the broken line 13 and consequently signals received from a target disposed on this reference axis by respective elements $\mathbf{12}_1$–$\mathbf{12}_n$ will be in phase with each other.

Figures 5, 6:
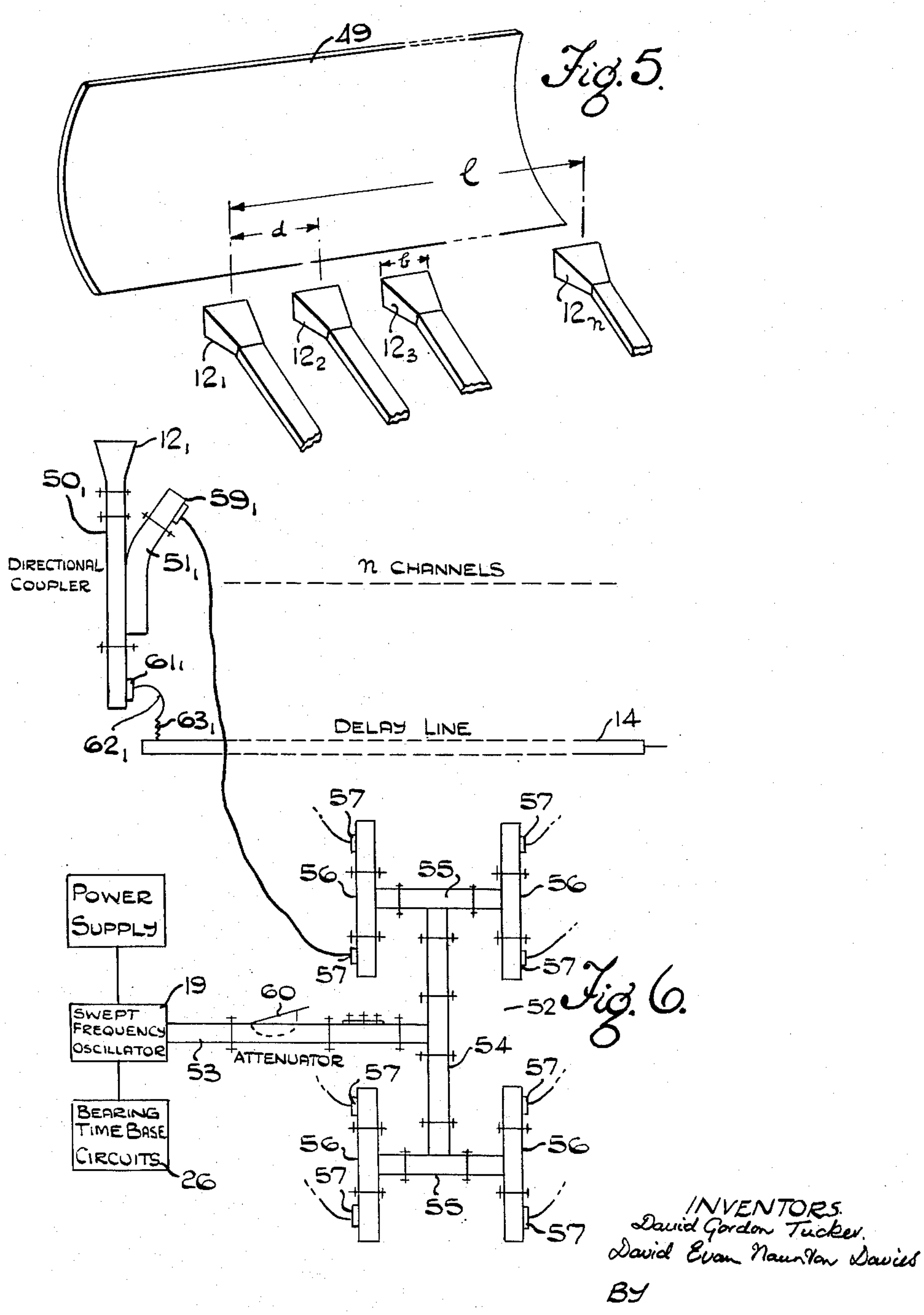
FIGURE 5 is a fragmentary perspective view illustrating the arrangement which may be adopted in respect of the horns of the receiver antenna array for any of the embodiments of FIGURES 1 to 4.
FIGURE 6 is a schematic diagram illustrating in somewhat greater detail the manner of feeding the output from the local frequency swept oscillator to the individual signal channels so as to provide equal path lengths to each channel in the feed line connecting same to the oscillator, this arrangement being applicable to any of the embodiments illustrated in FIGURES 1 to 4.

The elements $\mathbf{12}_1$–$\mathbf{12}_n$ may, as shown diagrammatically in FIGURE 5, be constituted each by a flared horn member fed directly at its narrower inlet end by a wave guide.

Considerations which govern the design and construction of the receiver antennae are well understood in the art, but the following works are mentioned as being typical publications to which reference may be had:

"Microwave Antenna Theory and Design," by Silver, published in Radiation Laboratory Series No. 12 by McGraw-Hill Book Company Inc., 1948.

"Aerials for Centimetric Wavelengths," by D. W. Fry and F. K. Goward, published in the Modern Radio Technique Series by Cambridge University Press, 1950.

Typically the flared horns $\mathbf{12}_1$–$\mathbf{12}_n$ may be directed towards a reflector 49 of parabolic form in cross section. This is of assistance in increasing the gain of the antenna array.

Although the publications above referred to provide detailed information as to design considerations, it is herein stated for convenience that the length of the array is determined by the beam width required ($\theta$).

The relevant equation is $$\theta \doteq \sin^{-1}\left(\frac{\lambda}{l}\right) \text{ radians}$$

where $\lambda$ is the wavelength and $l$ is the length of the array.

The number of antenna elements $12_1$–$12_n$ required within the length $l$ is determined by the angle over which it is required to scan the beam, taking into account any beam distortion which may occur at the lateral margins of the sector. The following relations apply:

$$\text{Sector width} \leqq n\theta$$

when $$d \geqq \lambda$$

where $n$ is the number of antenna elements and $d$ is the lateral spacing between these elements.

The sector width may tend to a limit of 180 degrees for narrow spacings $d$ of the elements less than $\lambda/2$.

The reason for this is that the resultant polar diagram of the array is the product of two factors, these being the polar diagram of an array of $n$ point sources and the polar diagram of one individual antenna element.

When $d$ is equal to or less than $d \leqq \lambda/2$ there is only one main lobe in the range of real angles for all angles of deflection.

Furthermore, if the antenna elements consist of point sources other main beams can occur (though they may always remain outside the scan sector). These may be removed by making each antenna element directive.

Deflection of the beam to one side or the other of the reference axis is contrived by applying to each of the signals fed out from the elements $12_1$–$12_n$ into respective channels $50_1$–$50_n$ and before they are combined with each other a phase-shift. Conveniently, but not essentially, the phase-shift imparted to the various signals is such that there is an equal phase difference of the same sign between the signal received from each element of the array and the signal received from the next adjacent right hand side as seen in FIGURE 1.

This may be done by feeding the signals from the elements $12_1$–$12_n$ inclusive to tapping points at the left hand ends of respective sections $14_1$, $12_2$ of a delay line including $n-1$ sections, the element $12_n$ feeding to the right hand end of the section $14_{n-1}$.

Thus, the output taken from the left hand end of the delay line 14 will have a maximum amplitude when the phase difference between the various signals incident at the elements $12_1$–$12_n$ of the antenna array is exactly offset by the phase shift imparted to the various signals by passage through the sections of the delay line 14. It will be evident that the signal from element $12_2$ will traverse only section $14_1$ of the delay line, whereas the signal from element $12_3$ will traverse two sections $14_1$ and $14_2$ of the delay line and will, therefore, undergo a greater (for example, twice) phase-shift in the delay line. The particular phase-shift produced by passage of the signal components from the elements $12_1$–$12_n$ through the delay line 14 will thus correspond to a particular beam deflection to the right of the reference axis 13 since the wave front must arrive at the element $12_1$ somewhat later than the time of its arrival at the element $12_n$ for the delay line to produce an exact compensation of phase-shift.

Similarly if the combined signal were to be extracted from the right hand end of the delay line 14 such signal would be at a maximum when the target producing the signal is offset to the left of the reference axis 13 so that in effect the beam may be considered as deflected angularly to the left in this case.

If desired, each of the channels through which signals are fed from the elements of the antenna array to respective tapping points on the delay line may include amplifier means for the purpose of improving the noise factor of the system. Such amplifier means may comprise in each case resonator klystrons connected as amplifiers and these may be connected in the channel concerned between the antenna array and the modulators $35_1$–$35_n$ (hereinafter referred to in greater detail).

The delay line 14 employed is frequency sensitive so that the magnitude of the phase-shift which each of the signals fed from the several antenna array elements to the delay line suffers before arrival at the left hand thereof is dependent upon the carrier frequency at which such signal is transmitted through the delay line. Thus, for any particular value of this carrier frequency the beam of the array 12 will be offset angularly in relation to the reference axis 13 by such an amount that the difference in phase of signals arriving at the several elements $12_1$–$12_n$ when incident from a direction coincident with the beam will be exactly offset by the differential phase-shifts which these signals suffer in the delay line so that they arrive in phase at the left hand thereof. By modulating the incoming carrier with a locally generated signal of varying frequency and extracting a single side-band (the difference frequency) the frequency of the carrier in the delay line is varied continuously (in each cycle of frequency sweep) and the receiver antenna beam can thus be made to swing or scan a given sector, the angular limits of which are determined by the magnitude of the frequency sweep.

Figure 2:
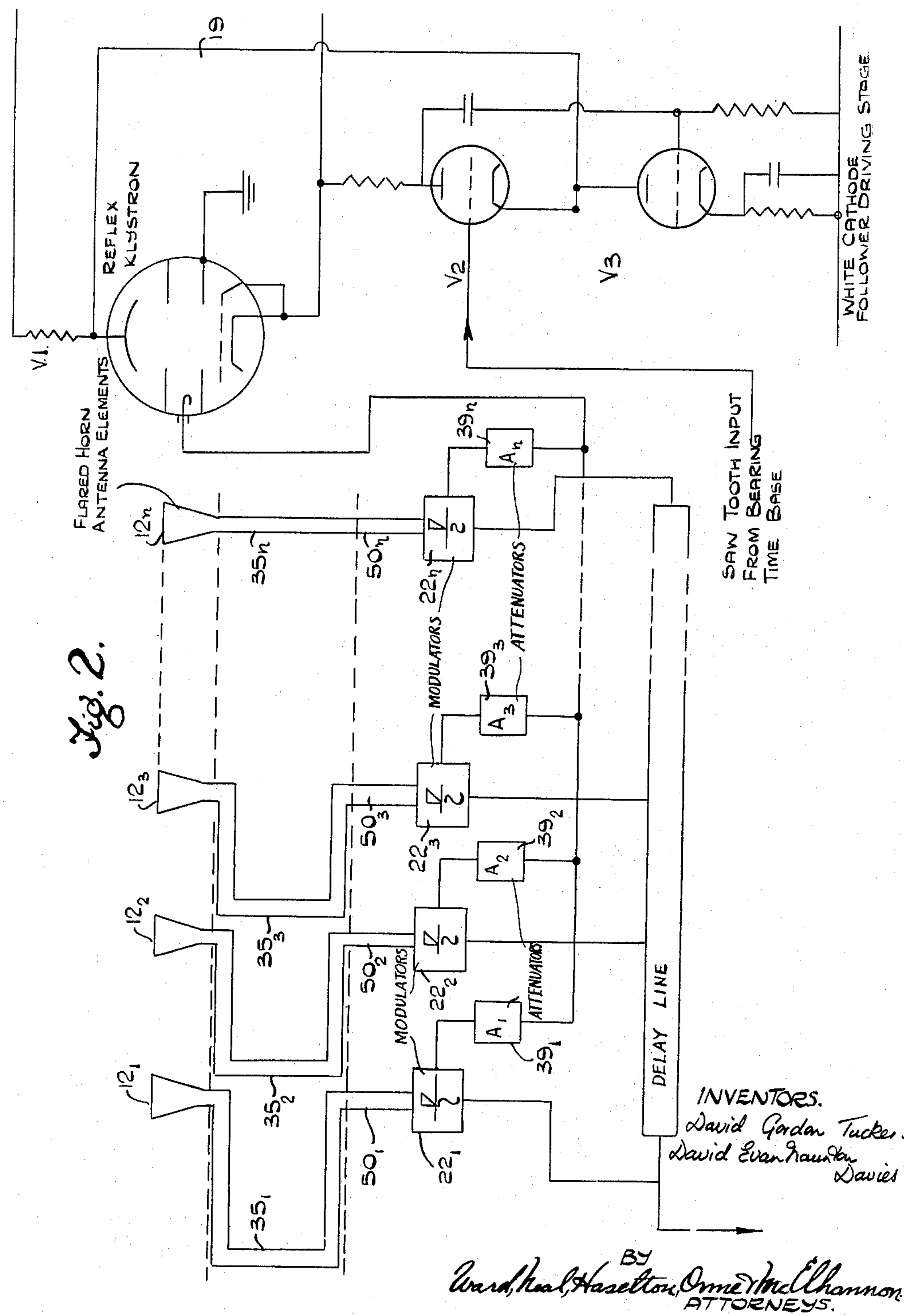
FIGURE 2 is a schematic diagram of the form of apparatus shown in FIGURE 1 illustrating in somewhat greater detail the form of certain components and the circuit arrangement adopted in respect of the receiver antenna array, compensating units, modulators, and frequency swept oscillator.

This manner of operation is carried into effect by providing a frequency swept oscillator 19, the output of which is mixed with the incoming carrier in each of the channels connecting the elements $12_1$–$12_n$ of the array with their respective tapping points of the delay line 14 in modulator stages such as that shown at $22_1$–$22_n$ (FIGURES 1 and 2).

Frequencies other than the difference frequency are sufficiently attenuated in the modulator stages $22_1$–$22_n$ themselves, or in the channels $50_1$–$50_n$ feeding the delay line 14, or in the latter, and consequently the output appearing at the left hand end of the delay line consists of the combination of pulses fed into the delay line by the various channels, the carrier frequency of these pulses being the difference frequency at any instant between the received carrier at the array and the locally generated variable frequency signal of the swept frequency oscillator 19.

This result could be attained by providing phase-shift elements individual to respective channels $50_2$–$50_n$ i.e. so that each such element is traversed only by its respective signal, but the arrangement shown is preferred in that a greater aggregate length of delay line or equivalent phase-shift element would be required to obtain the value of phase-shift required in each channel prior to combination of the signals.

Another possible alternative is to insert the phase-shift elements in the feed from the oscillator 19 to the several channels $50_1$–$50_n$. This could be done using a tapped delay line as the feed line.

In all these arrangements it is pointed out that the phase change produced as between successive channels by the phase-shift element is greater than that which would occur in transit of a signal (in space or in ordinary feed channel e.g. a wave guide) over the distance laterally separating adjacent elements $12_{n-1}$–$12_n$ of the array In fact in order to achieve the required phase-shift as between successive channels to produce a satisfactorily large beam deflection the difference of length of phase-shift element as between successive changes should incorporate a multiple of $2\pi$ phase change thus the physical length (in the case of a cable) will be appreciably greater than the lateral spacing between antenna elements. Thus a physically compact array can be made to produce a swinging beam without use of great separation between adjacent elements and long feed channels thereto.

Reverting to the treatment of the combined signal in the system shown in FIGURE 1, after emergence of such signal from the delay line 14, such signal is subjected to amplification in or intermediate frequency amplifier 15 rectified in a detector such as 16 and further amplified in a video amplifier 17 preparatory to feeding to the control grid of a cathode ray tube 18 so as to effect a brightening of the cathode ray spot during continuance of the signal at the control grid.

Figure 12:
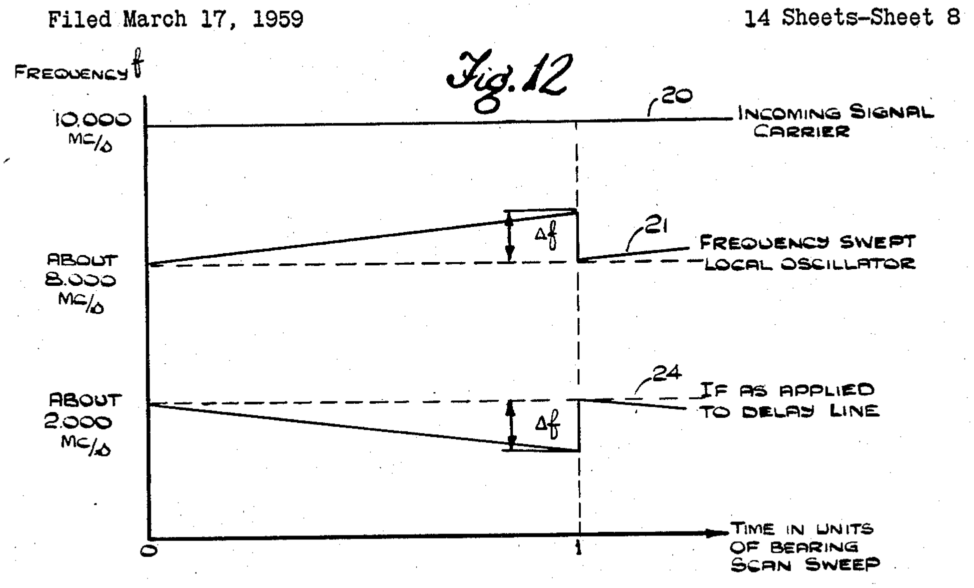
FIGURE 12 is a graph illustrating the frequency variation of the locally generated signal in relation to the carrier frequency of the incoming signal and showing also the resultant intermediate frequency carrier.

The frequency swept oscillator 19 provides an output whose frequency-time characteristic may be typically as shown by the curve 21 in FIGURE 12, the frequency of the carrier signal as fed out from each of the elements of the array 12 being represented by the line 20.

In FIGURE 2 is shown an arrangement wherein a reflex klystron $V_1$ is utilized. The generated frequency varies in accordance with the voltage applied to the reflector electrode. This modulating voltage may be in the form of a linear saw tooth applied to the control grid of valve $V_2$ which in combination with the valve $V_3$ constitutes a "white cathode follower."

Figure 13:
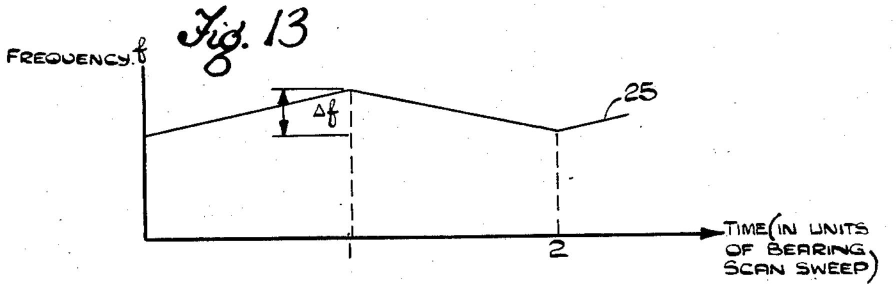
FIGURE 13 is a graph illustrating an alternative frequency-time characteristic for the locally generated swept frequency signal.

Frequency variation in accordance with FIGURE 13 may be employed, the modulating voltage fed to $V_2$ may be obtained by integrating and amplifying a square wave, which is produced either by the master oscillator 31, or is synchronized therewith.

This form of frequency variation reduces the bandwidth required in the delay line 14 and amplifier 15. This is advantageous in that for a given value of sector scanned (in terms of number of beam widths of the receiver array) it enables the requisite number of harmonics of the pulse envelope (avoiding significant loss of information) to be more readily accommodated; also it enables the ratio of frequency sweep to time-delay per section of the delay line to be increased with beneficial effect in avoidance of beam distortion at the ends of the scanned sector as hereinafter explained in greater detail.

The klystrons are readily available for producing power outputs in excess of 200 milliwatts which provides an adequate margin for de-coupling attenuators between the swept frequency oscillator 19 and the modulator stages $22_1$–$22_n$.

Certain types of reflex klystrons can without difficulty be swept in frequency over ranges of 100 megacycles per-second or more if desired by variation of the reflector electrode potential.

The manner of operation and design of oscillator circuits utilising reflex klystrons is known in the art. Reference for this purpose may be had to the following publications:

"Klystrons and Microwave Triodes," by Hamilton, Knipp and Kuper, published in the Radiation Laboratory Series No. 7 by McGraw-Hill Book Company Inc., 1948.

"Klystron Tubes," by A. E. Harrison, published by McGraw-Hill Book Company Inc., 1947.

Klystrons of the Mullard type KS9–20 or U.S. type 723A/B klystrons can provide a frequency sweep of about 30 megacycles per second on the "X" band (3 centimetres) without excessive amplitude modulation. The choice of a suitable klystron would depend upon the frequency sweep required.

For larger sweeps backward wave oscillators such as Mullard type BA9–20 may be used.

For particulars as to circuit design and a fuller explanation as to manner of operation reference may be made to the following publications:

"Backward Wave Oscillators," by A. G. Stainsby, Electronic Engineering, volume 30, May 1958, published by Morgan Bros. Limited, London.

Proceedings of the Institute of Electrical Engineers, volume 100, part 3, 1953, paper by R. Warnecke and P. Guenard.

This publication provides data as to recent work in France and new types of valves for the highest radio frequencies.

The characteristic represented by the curve 21 is such that the oscillator is swept through its range of frequency in a time which is equal to the duration of the transmitted pulse, for example 1.0 microsecond. There is no necessity for this time to be equal to that of the transmitted pulse, it could, for example be less, but no particular advantage is secured thereby and certain possible disadvantages hereinafter referred to in greater detail are avoided if there is equality between these two quantities.

If the time occupied by the frequency sweep from its lowest to its highest value is greater than the duration of the transmitted pulse then for the reason previously explained some information may be lost since it would be possible for a signal to be incident at the receiving array only at such time as the beam thereof was not directed towards the source of the signal.

If a complete scanning sweep is performed within a time equal to the pulse duration it will be apparent that starting with the instant at which a reflected wave front is incident at the receiving aerial array 12 the beam being formed by this array will be caused to execute a complete sweep or scan of the sector to be explored during continuance of the signal, that is to say, for the duration of the transmitter and hence the reflected pulse. A signal will only be fed out from the left hand end of the delay line however, for the proportion of this period during which the receiving aerial array is "looking" in the direction of the target so that in effect this signal represents a vertical slice or sample of the originally transmitted pulse.

The particular time at which this sample pulse appears at the output end of the delay line, reckoned from the time at which the beam of the receiving aerial array leaves its starting or datum position to execute one sweep of the explored sector, thus corresponds to the position occupied by the beam when the beam axis is coincident with the target, and consequently this signal displayed on or otherwise co-related with a time base starting concurrently with each beam sweep provides information as to the target direction. It will be understood that the velocity of sweep of the beam will be constant when utilising a swept frequency oscillator having a characteristic such as 21 providing a saw tooth wave form of frequency variation with respect to time, in conjunction with a delay line having a linear phase-shift frequency characteristic.

In practice some advantages are gained, as previously referred to, by utilising a swept frequency oscillator having a frequency-time characteristic as illustrated by the curve 25 of FIGURE 13 (which reduces the frequency spread). In this case the beam of the receiver aerial array would sweep at uniform speed from one side to the other of the explored sector instead of sweeping at a steady speed in one direction and having a very rapid or practically instant fly back in the other direction, and consequently time base circuits for providing a time base on or in relation to which the resultant signal is required to be displayed or co-related would require to produce an output of the same general form as the curve 25.

The modulating signal from the swept frequency oscillator 19 should be applied to each modulator $22_1$–$22_n$ without phase shift as between one modulator and another, and the channels should be de-coupled from each other to prevent cross modulation by attenuators as shown at $39_1$–$39_n$, FIGURE 2.

An arrangement in which this condition is ensured is illustrated in FIGURE 6.

In this only one of the channels $50_1$ is shown for simplicity and introduction of the locally generated signal is effected by means of a directional coupler $51_1$. The physical arrangement of this coupler is such as to feed the locally generated signal into the channel 51 (which may be constituted by a length of wave guide) in a direction such that the locally generated signal travels down the channel in the same direction as the incoming signal fed into it from the associated antenna element $12_1$ without the locally generated signal leaking up the channel towards the antenna element $12_1$.

Connection between the coupler $51_1$ and the swept frequency oscillator 19 is effected through a wave guide structure indicated generally at 52, characterised by the provision of a main section 53 which is connected to branch elements 54, 55 (two) and 56 (four) each branch element being joined with the preceding branch element of the series through a T junction. This arrangement provides a plurality of physically separated outlets 57 (eight being present in the particular example illustrated) each of which has an equal path length to the local oscillator 19 compared with that afforded by each of the others. In general it will be appreciated that the number of branches required to be incorporated in the wave guide structure is $n/2$ to provide the requisite number of outlets to feed all the channels. In the outlets signals may be picked up by a probe projecting into the wave guide branch concerned and connected by a cable such as that indicated at $\mathbf{58}_1$ to an inlet $\mathbf{59}_1$ at which another probe projects into the directional coupler $\mathbf{51}_1$.

The main branch 53 of the main guide structure may include an attenuator 60 to provide some de-coupling between the local oscillator and the outlets 57 and also to control the amplitude of the locally generated signal furnished to the directional couplers such as $\mathbf{51}_1$.

At or near the lower end of each channel $\mathbf{50}_1$ (which may be a wave guide as previously mentioned) a unit $\mathbf{61}_1$ incorporating a silicon crystal is provided. The coupler $\mathbf{51}_1$, the crystal unit $\mathbf{61}_1$, and the intervening portion of the channel $\mathbf{50}_1$ constitutes a modulator stage in which the locally generated swept frequency signal is mixed with the incoming signal and a single sideband of the resultant (the difference frequency) is extracted and delivered to the lead $\mathbf{62}_1$ from the crystal unit $\mathbf{61}_1$.

Silicon crystals usually require less than one milliwatt from the local oscillator in order to operate satisfactorily, and the design of the modulator means is thus not especially critical. Preferably a resistor $\mathbf{63}_1$ is included in the lead $\mathbf{62}_1$ to provide de-coupling between each channel and the delay line 14 and also to present to the delay line at the tapping point concerned a high impedance.

The design of microwave mixers is understood in the art, but reference may be had on this subject to a publication entitled "Microwave Mixers," by Pound, published in the Radiation Laboratory, Series No. 16, by McGraw-Hill Book Company Inc., 1948.

The delay line 14 may comprise a cable of suitable phase-shift frequency characteristic at frequencies up to 3000 megacycles per second.

Tapping points would be provided at the required distances along the cable constituting the delay line.

Figures 7, 8:
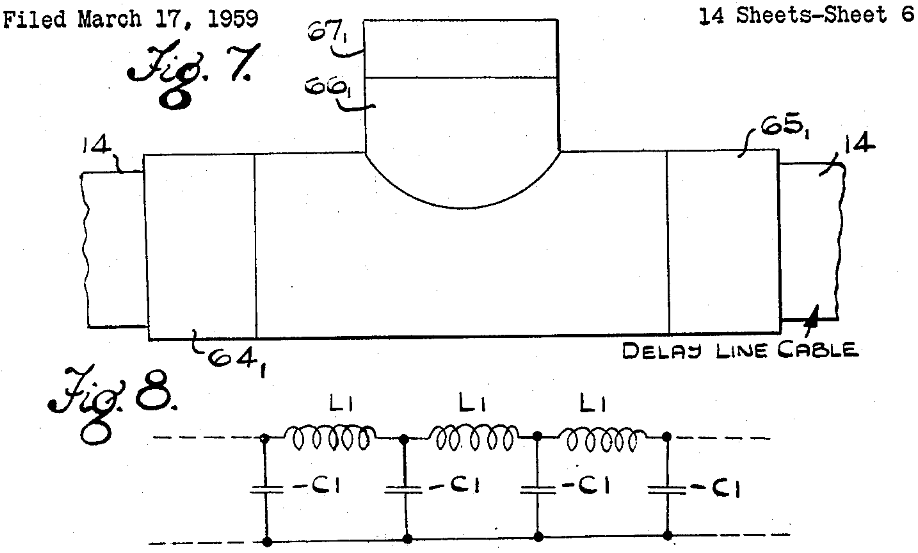
FIGURE 7 is a fragmentary view illustrating a coupling unit of a T-form which can be incorporated in the delay line to connect the signal channels thereto and is applicable to any of the embodiments of FIGURES 1 to 4.
FIGURE 8 is a circuit diagram of a portion of the delay line utilising lumped circuit components and is applicable to any of the embodiment shown in FIGURES 1 to 4.

In FIGURE 7 is shown a typical fitting which may be incorporated in the delay line to enable each channel $\mathbf{50}_1$–$\mathbf{50}_n$ to be connected thereto. Such connector is known normally as a T daptor, the end portions $\mathbf{64}_1$ and $\mathbf{65}_1$ including internally screwed caps for screwing onto externally threaded spigots, provision being made to trap and make electrical contact with the sheath of the cable sections of the delay line 14 connected to these end portions respectively.

The lateral projection $\mathbf{66}_1$ may likewise incorporate a screwed cap $\mathbf{67}_1$ for making connection with the sheath of the lead $\mathbf{62}_1$.

Suitable types of T adaptor are as follows:

U.S. Military type No. UG-566 A/U
U.S. Military type No. UG-107 A/U
U.S. Military type No. UG-274/U
U.S. Military type No. M-358
U.K. Air Ministry type No. 10 AD/2845 (as an alternative)

For intermediate frequencies of 3000 megacycles per second or more the delay line 14 may be constituted by a length of wave guide, in which case the manner of effecting connection thereto at the requisite tapping points will be well understood in the art.

At intermediate frequencies up to about 500 megacycles per second lumped circuit delay lines may be employed. A typical example is shown in FIGURE 8. The values of the inductive components L1 and C1 may be readily determined by reference to publications on delay line design of which the following is quoted by reference:

"Filter Design Data for Communication Engineers," by J. H. Mole, published by F. and F. N. Spon Limited, London, 1952.

The time base circuits indicated at 26, FIGURE 1, are in practice utilised to provide an output for effecting frequency sweep of the swept frequency oscillator 19 as well as the requisite output through an amplifier and detector circuit 27 feeding the deflection coil means 28 of the cathode ray tube 18.

In addition to providing information as to the direction of the target, the apparatus may be required to provide range information and consequently the cathode ray spot is also displaced in accordance with the current or voltage provided by a range time base circuit 29 also feeding the deflector coil means 28 or an electrostatic deflector electrode.

Figures 10, 11:
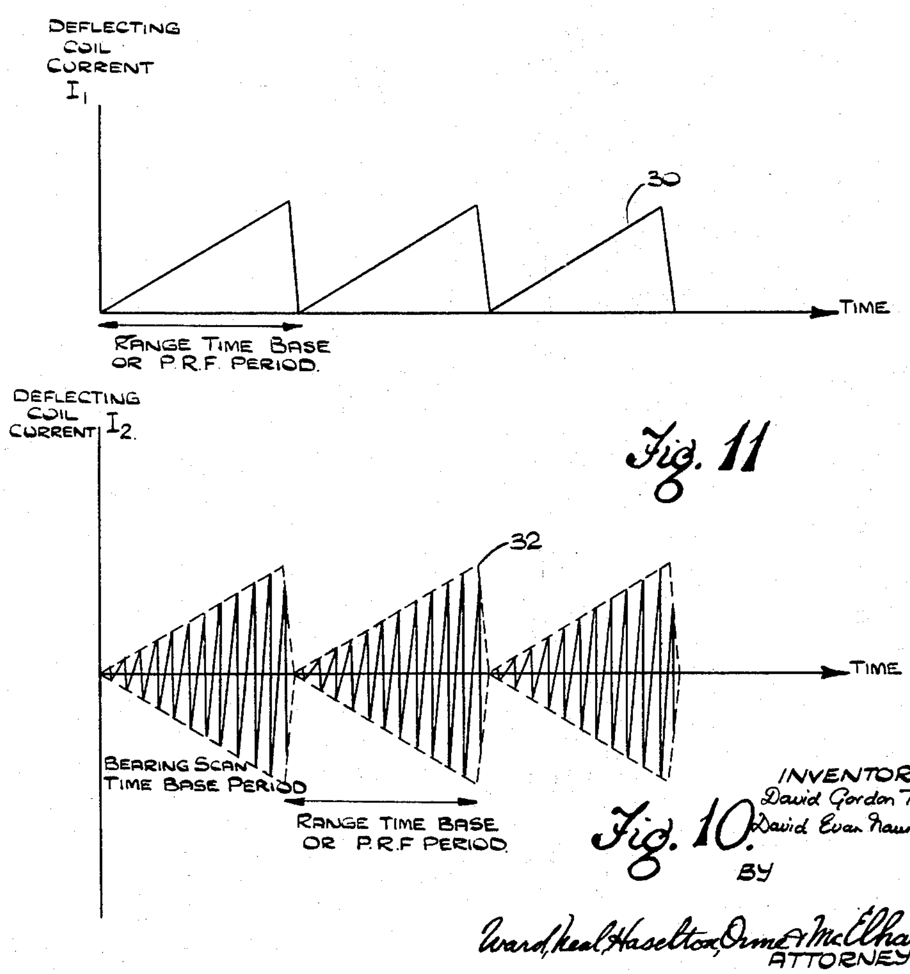
FIGURE 10 is a wave form diagram illustrating the range time base wave form and is applicable to any of the embodiments shown in FIGURES 1 to 4.
FIGURE 11 is a wave form diagram illustrating the bearing time base wave form and is applicable to any of the embodiments shown in FIGURES 1 to 4.

The form of display provided by the cathode ray tube 18 may be of the plan position indicator type in which case the outputs from the bearing or directional time base circuit 26 and the range time base circuit 29 will require to be co-related with each other in the manner illustrated in FIGURE 10. The range time base output is represented by the saw tooth curve 30 while the bearing or directional time base is represented either by a saw tooth curve (if the swept frequency oscillator is required to have the characteristic as shown at 24, FIGURE 12) or a symmetrical zig-zag characteristic (if the swept frequency oscillator is required to have characteristic of the curve 25, FIGURE 13) of an amplitude which increases according to an envelope corresponding to the range time base curve 30 as indicated at 32, FIGURE 10.

If a display of the B-scan type were employed it would not be necessary to modulate the bearing time wave form with the range time base voltage.

Both time base circuits 26 and 29 may be controlled by a master oscillator circuit 31.

Figure 9:
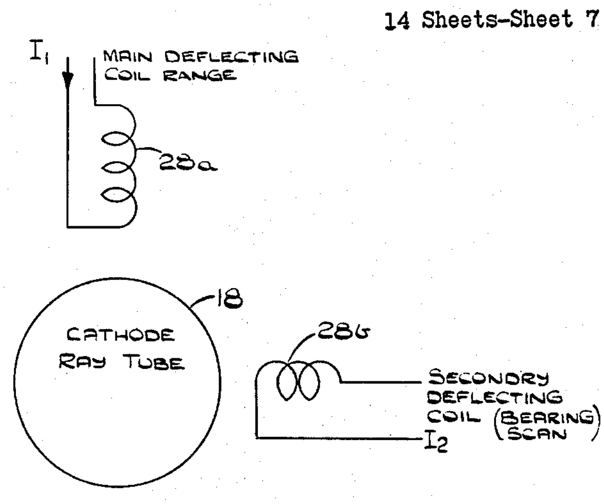
FIGURE 9 is a schematic diagram showing deflector coil means of the display cathode ray tube, for receiving an output from a range time base and a bearing or directional time base for a plan position indicator type of display and is applicable to the embodiments shown in FIGURES 1 and 2, and in FIGURE 4.

As seen in FIGURE 9 the range and bearing or direction time base outputs may be fed to separate coil elements 28$a$ and 28$b$ of the deflector coil means 28 to produce spot deflections at right angles to each other and both coil elements 28$a$ and 28$b$ may be rotated or oscillated mechanically in correspondence with bodily rotation or oscillation of the receiving and transmitting antennae arrays 12. Thus, a radial line traced out on the screen of the cathode ray tube in consequence of the range time base output would represent a reference axis 13 of the receiving antenna array 12 (in the absence of any output of the bearing or direction time base) and when this latter output is applied would execute a high speed scan or exploration on each side of this radial line in correspondence with the swinging of the beam of the receiving antenna array 12 to one side and the other of the reference axis 13 according to the variation in phase-shift produced by the delay line 14.

A length of cable may be utilised for the delay line, such cable being selected to have a phase-shift frequency characteristic which is linear or approximately so. In some arrangements a non-linear characteristic, e.g. a parabolic characteristic may be required over the working range as hereinafter explained.

If as a result of the change in frequency of the intermediate frequency carrier from one limit to another limit the delay line phase-shift characteristic runs from positive to negative or vice versa in the course of the frequency sweep (being zero or a multiple of $2\pi$ at the mid value of the sweep) then the beam of the receiving antenna array will swing through an equal angle on each side of the axis 13. If the phase-shift runs from zero to positive or negative the beam will swing in a sector to the right or left respectively of this axis as previously referred to.

Figure 3:
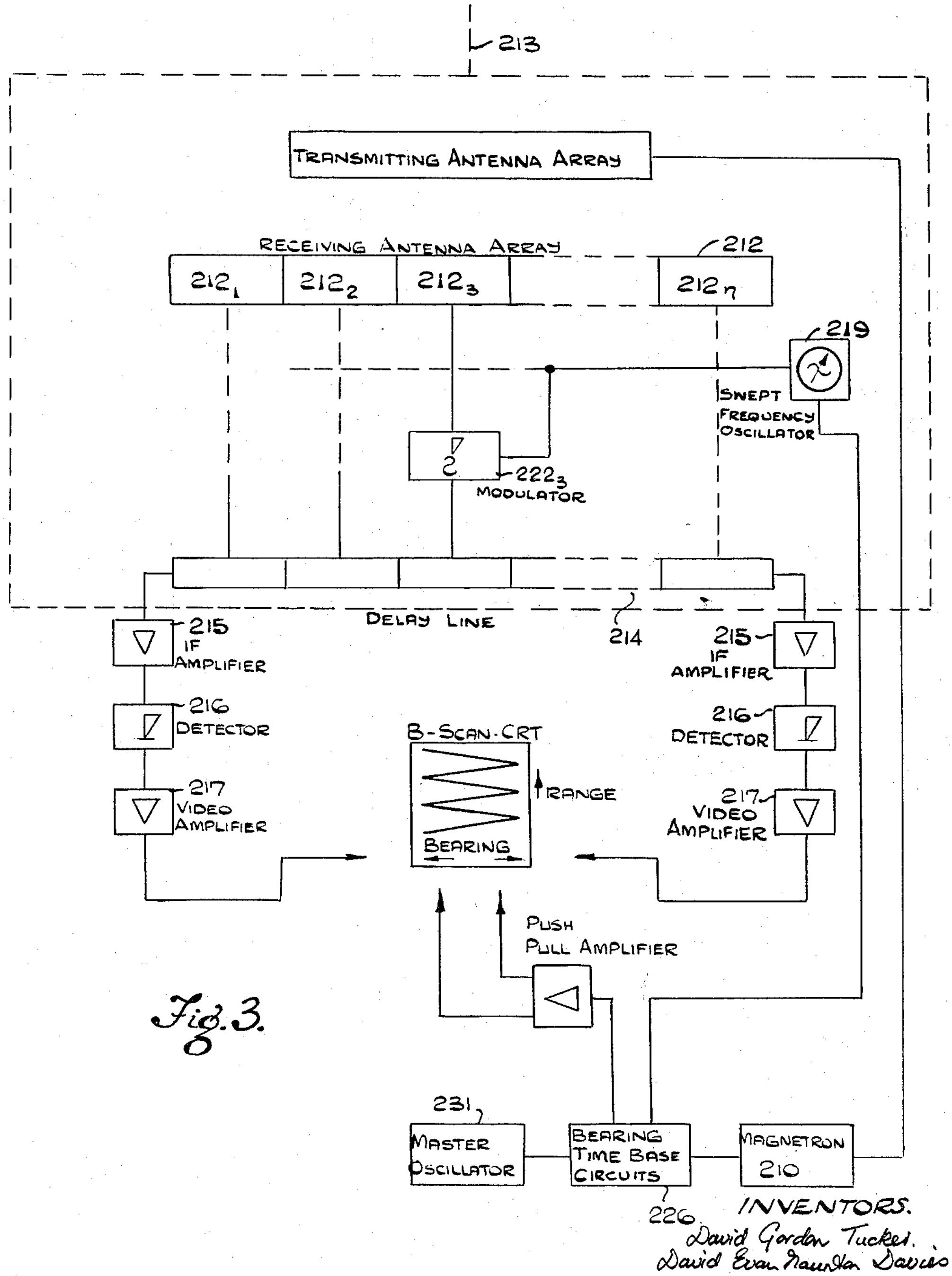
FIGURE 3 is a schematic diagram similar to FIGURE 1 illustrating an alternative form of position finding radar apparatus in accordance with the invention, utilising output from both ends of a delay line which forms the phase-shift element for the various channels, both outputs being displayed on a twin beam cathode ray tube.

At this stage it is convenient to refer to the schematic diagram of the alternative embodiment of the invention shown in FIGURE 3. In this arrangement components and assemblies which are equivalent to those illustrated in and described with reference to the embodiment shown in FIGURE 1 are designated by like numerals of reference with the addition of prefix 2, so that for example the receiver antenna array is designated 212 instead of 12 and other corresponding components or assemblies in an analogous manner.

The main difference in the embodiment of FIGURE 3 is that instead of terminating one end of the delay line 14 with an impedance equal to the characteristic impedance of the delay line and utilising output from the other end of the delay line only, the embodiment of FIGURE 3 provides for the use of output from both ends of the delay line 214.

The advantage realised by this modification in the embodiment of FIGURE 3 is that the rate of scanning may be reduced so that scanning is performed in a time equal to twice the duration of the transmitted pulse without significant loss of information from the sector to be scanned.

This arises from the fact that as viewed from the left hand end of the delay line 214 a receiver antenna beam may be "seen" which swings, for example from the right hand side of the scan sector to the left hand side, in consequence of a single sweep of the swept frequency oscillator 219, whilst another beam may be "seen" from the right hand end of the delay line 214 swinging simultaneously from the left hand side of the scanned sector to the right hand side.

The use of the signal incident at the right hand end of the delay line 214 represents an absolute gain over the dissipation of this signal in a terminating impedance. As seen in the embodiment of FIGURE 3 the output from the right hand end of the delay line 214 proceeds through an I.F. amplifier 215, a detector 216, and a video amplifier 217 to feed the grid which modulates the intensity of one of the electron beams of a twin beam cathode ray tube, the other beam being also intensity modulated by the output received from the left hand end of the delay line 214 and fed through similar amplifier, detector, and video amplifier units.

The two beams may provide a scanning raster extending for the full width of the tube screen so that in fact they cross each other in the central region, the cathode ray tube being provided with a further deflecting means operative in a direction perpendicular to that in which the deflecting means energised by the output of the push-pull amplifier to which the bearing time base circuit is connected operates. These further deflecting means provide a range time base to form a B-scan presentation.

In this arrangement each of the beams may take twice as long to scan the sector than is the case for the embodiment of FIGURE 1 and no appreciable loss of information from the sector will result due to the presence of the companion beam. The phase-shift (and hence delay) per section of delay line 214 may thus be reduced, and this is helpful in minimising certain types of distortion hereafter referred to in greater detail.

Figure 4:
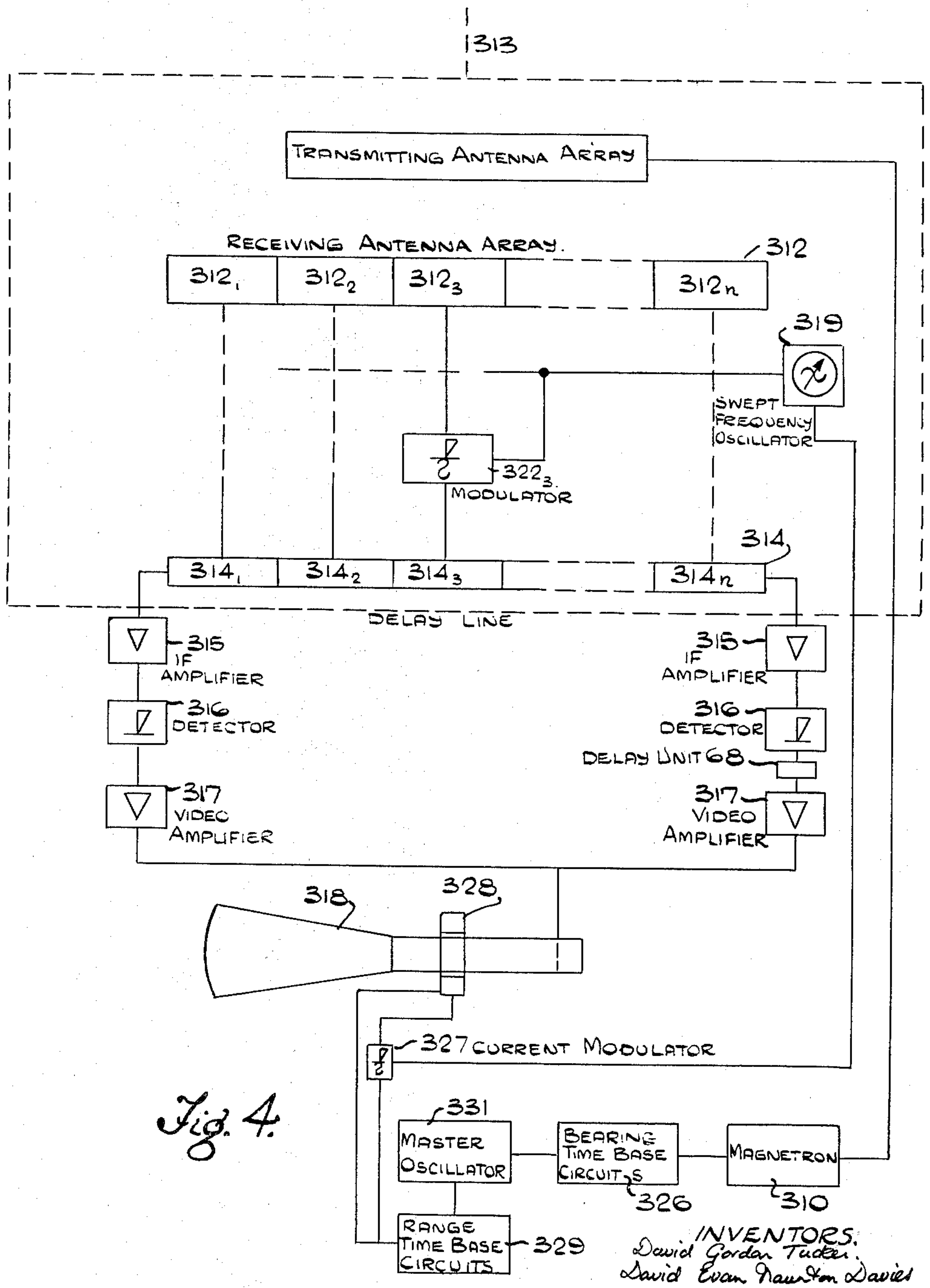
FIGURE 4 is a schematic diagram similar to FIGURE 3 showing a further alternative form of position finding radar apparatus in accordance with the invention, wherein output is utilised from both ends of a delay line, such outputs being fed to a single beam cathode ray tube to augment the signal-to-noise ratio of the display thereon.

In the third alternative embodiment shown in FIGURE 4 wherein again output is taken from both ends of the delay line, components and units corresponding to those of FIGURE 1 are designated by like numerals of reference preceded by the figure 3 so that, for example, the receiver antenna array is shown as 312 instead of 12 and other corresponding components and units are similarly designated.

In this case, however, the additional signal received from the right hand end of the delay 314 is utilised to increase the signal to noise ratio incident at the cathode ray tube 318.

This is done by provision of a delay unit 68 between the detector 316 and the video amplifier 317 in the channel from the right hand end of the delay line. This requires a frequency sweep of the kind shown in FIGURE 13.

This will bring signals received at the outputs of the video amplifiers 317 substantially into time coincidence with each other (the delay produced by the unit 68 being one half a complete scanning period, i.e. the time necessary for one beam to swing from one lateral extremity of the sector to the other lateral extremity).

Referring now to the various forms of distortion which may occur in respect of the combined signal appearing at the output end or each of them of the delay line, reference will now be made to the manner in which these various forms of distortion may be overcome or reduced.

The first form of distortion may arise through the existence of an unwanted phase-shift in the modulated signal passing down each channel $50_1$–$50_n$ by the time such signal reaches the output end of the delay line 14 by virtue of the path difference along the delay line itself.

In practice it can be shown that mathematically the phase-shift imparted to each signal consists of two components $\phi_1$ and $\phi_2$ which are given by the equations.

$$\phi_1 = -(n-1)t_2\ (w_1 + xt)$$

$$\phi_2 = \tfrac{1}{2}x(n-1)^2 t_2^2$$

where $t_2$ is the time delay per section of the delay line, $w_1$ is the difference frequency between the incoming carrier and the mean value of the locally generated frequency, $x$ is a constant measuring the rate of change of frequency of the locally generated signal, and $n$ is the number of the channel counted from the output end of the delay line.

The phase-shift $\phi_1$ is proportional to $(n-1)$ and also to time and fulfills the required condition for a phase-shift which varies linearly with time and is proportional to $(n-1)$.

The phase-shift $\phi_2$, however, represents a form of distortion in that it infers the presence of phase-differences which do not increase in equal steps from channel to channel, and would thus set up an actual beam position which differs from the calculated position.

This form of distortion may, however, be counteracted in an embodiment such as that shown in FIGURE 1 in which output is taken from one end only of the delay line by including in each signal channel a compensating unit which provides for that particular channel a phase-shift which exactly compensates for the term $\phi_2$ and which will thus vary from channel to channel but which remains constant for all beam positions.

A further cause of distortion as previously mentioned is time delay as between the pulse envelopes pertaining to the signals in respective channels.

Figure 17:
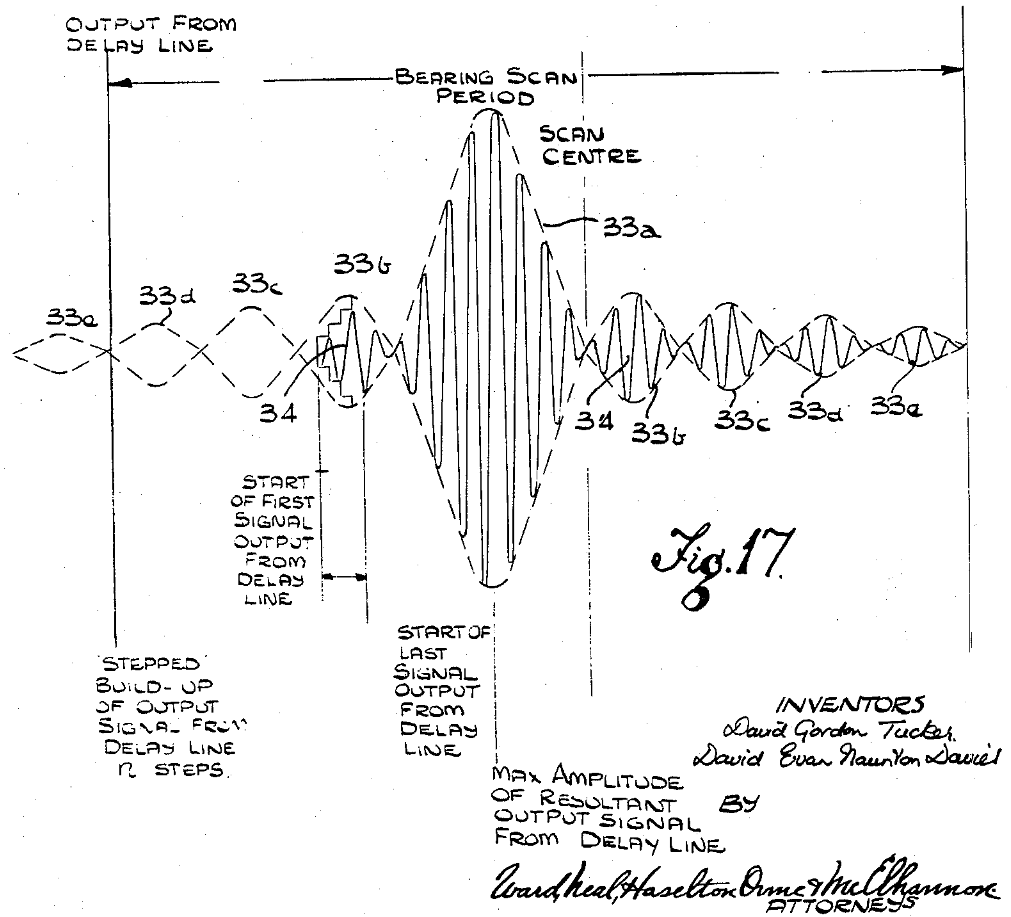
FIGURE 17 is a diagram illustrating the combined signal appearing at the output end of the delay line in a typical case when receiving signals from a target situated in between the limits of the sector in which high frequency scan of the beam of the receiver antenna array is performed.

This is illustrated in FIGURE 17 which shows a typical signal output as it appears at the left hand end of the delay line 14.

Assuming firstly that any given target situated somewhere between the angular limits of the sector explored by the high frequency beam scan were radiating continuously, the signal produced in consequence of swinging the beam through the sector would have the same form as the polar diagram of the receiving antenna array and this typically is illustrated by the broken line envelope 33 embodying a main central lobe *33a* and side lobes *33b*, *33c*, *33d* and *33e*.

In practice the target is not radiating continuously but is reflecting the transmitter pulses and it is assumed in FIGURE 17 that the wave front of a given pulse arrives at the receiving antenna array when the lobe *33b* on the left hand side of the main lobe happens to be directed towards the target.

At the left hand end of the delay line the signals combine together from the several elements $12_1$–$12_n$ of the receiver antenna array but these will not combine instantaneously because of the time delay produced by the delay line itself as previously referred to and there will, in practice, be a stepped build up of the signal at the left hand end of the delay line as represented by the carrier wave 34 filling in the envelope 33 in FIGURE 17. The peak value of the signal will of course appear when the beam is directed with its axis, i.e. its main lobe 33*a* in coincidence with the target direction.

Figure 18:
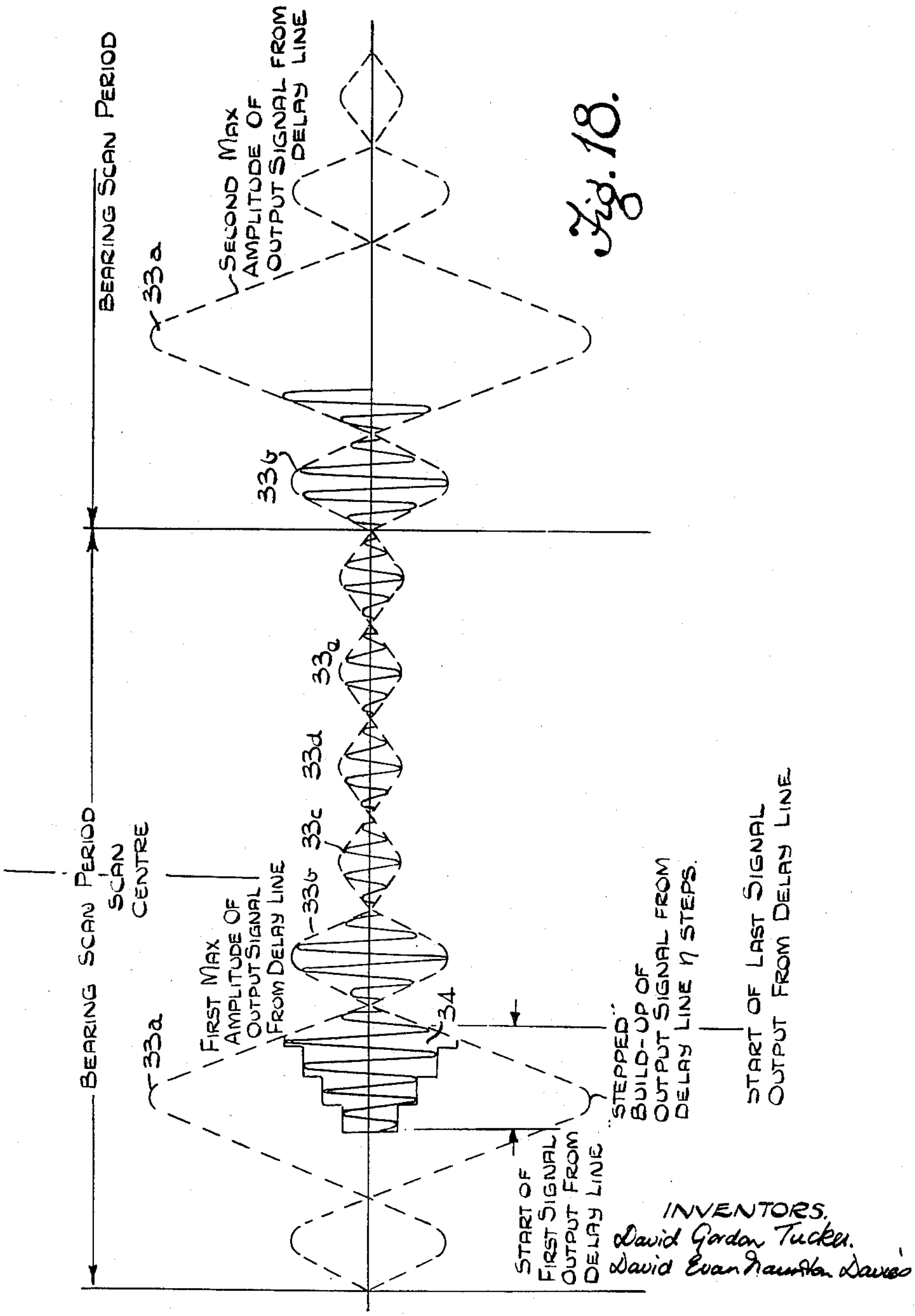
FIGURE 18 is a diagram similar to FIGURE 6 illustrating the combined signal appearing at the output end of the delay line in a case where the wave front is incident at the array at an extent at which the beam is directed exactly towards the target.

In the worst case is shown in FIGURE 18 when the wave front is incident at the receiver antenna array 12 at an instant at which the main lobe is directed towards the target, the main signal will be reduced in amplitude to a greater extent because the stepped build up arising from time delay in the delay line delays attainment of maximum signal amplitude until after the beam has moved away from the direction in which the target is situated.

To compensate for this distortion each of the channels through which the elements $12_1$–$12_n$ of the array feed their respective points on the delay line 14 may include a delay unit such as that shown typically at $35_3$.

The delay produced by each of these units would be different and of such magnitude that the wave front of each signal ultimately arrived simultaneously at the left hand end of the delay line 14.

Clearly, this expedient may be used only in an arrangement wherein output is taken from a single end of the delay line because the units such as $35_3$ would produce an aggravation of the delay were output taken from the opposite end of the delay line.

As already referred to generally, a second cause of differential delay in the arrival of various signals from the respective elements $12_1$–$12_n$ at the left hand end of the delay line, is that when the target is situated to one side or the other of the reference axis 13 the wave front itself will be oblique to the array 12. The differential delay will be approximately proportional to the magnitude of the angle subtended between the target and the reference axis 13 (assuming that this angle is small enough to approximate to its sine).

An expedient which may be adopted to compensate for this time delay is to utilise a delay line in which the unavoidable time delay produced therein varies with deflection of the beam in exactly the opposite way to the delay resulting from oblique incidence of the wave front.

A delay line which affords a time delay which is a maximum at zero phase-shift and falls linearly with increase in phase-shift provides a phase-shift frequency characteristic which is parabolic.

Figure 15:
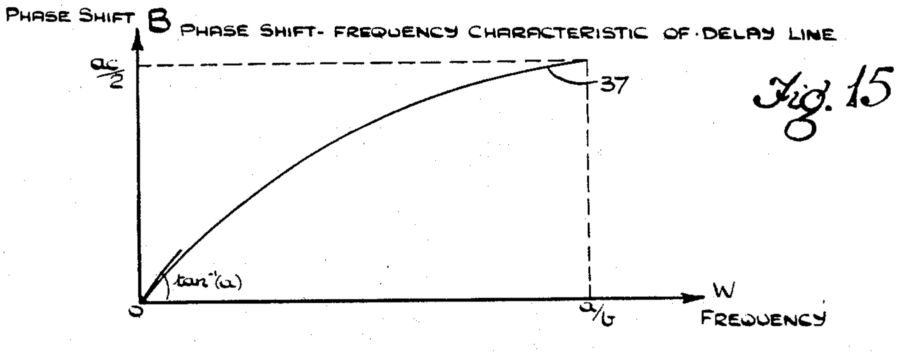
FIGURE 15 is a graph illustrating the phase-shift-frequency characteristic of a delay line adapted to compensate for differential delays (in the target containing medium) between incidence of the wave front at different elements of the receiver antenna array when the target is offset from the reference axis thereof and is applicable to the embodiment shown in FIGURES 1 and 2.
Figure 16:
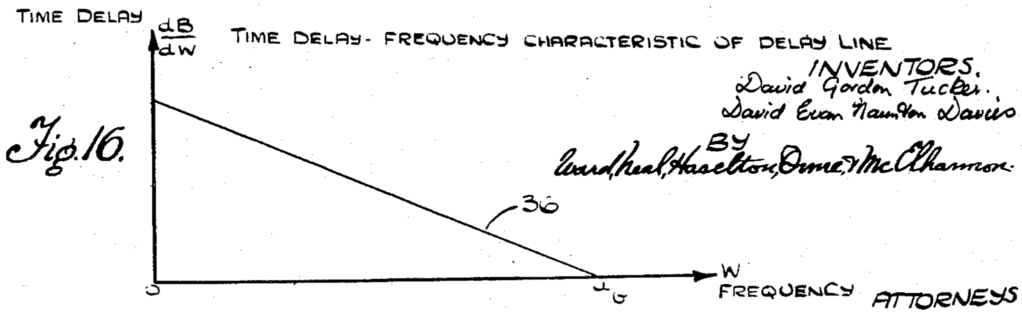
FIGURE 16 is a graph illustrating the time delay-frequency characteristic of such a delay line.

This will be apparent from consideration of the characteristics shown in FIGURES 15 and 16. As seen in FIGURE 16 the time delay frequency characteristic is a linear one of the general form.

$$\frac{dB}{dw}=a-bw \qquad (1)$$

where

B is the phase shift
$w$ is the frequency
$a$ and $b$ are constants

The phase-shift frequency characteristic is given by integration which yields the following equation:

$$B=aw-\frac{bw^2}{2}+c \qquad (2)$$

and if $B=0$ when $w=0$, then $c=0$.

Then $$\frac{dB}{dw}=0$$

when $$w=\frac{a}{b}$$

The characteristic represented by Equation 2 is that shown at 37, FIGURE 15.

The delay units $35_1$–$35_n$ may be constituted by lengths of wave guide (or if appropriate transmission line) which provide graded delays with phase-shift which compensates for distortion due to the phase-shift term $\phi_2$ previously mentioned. These units may thus comprise calculated lengths of wave guide or transmission line.

It will be apparent that since the phase-shift frequency characteristic of the delay line 14 is a parabolic and not linear form, as was previously assumed (for the sake of convenience in explanation), the frequency swept oscillator 19 should provide a corresponding parabolic characteristic as to change of frequency with respect to time when fed with a linear saw tooth controlling voltage from the time base circuit 26, otherwise spot position on the face of the cathode ray tube will not be a true representation of the position occupied by the beam of the array 12 at position in between the limits of the sweep.

Figure 14:
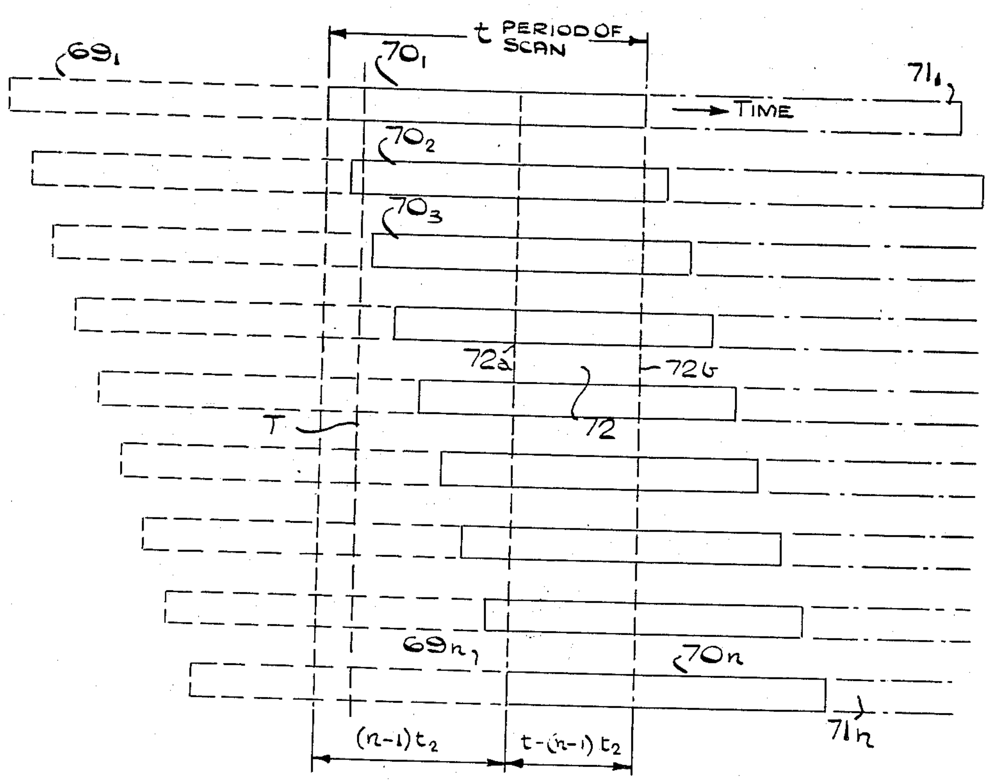
FIGURE 14 is a diagram illustrating the time staggered relation between groups of locally generated oscillations pertaining to the same frequency sweep and beam scan, and the manner in which the signals derived from these groups in the several channels combined properly with each other except in end portions of the groups.

In FIGURE 14 there is illustrated diagrammatically the manner in which some distortion of the combined signal (and hence malformation of the receiver beam) may take place in the lateral margins of the scan sector.

The full line rectangles $70_1$, $70_2$, $70_3$ and $70_n$ in FIGURE 14 represent groups of modulated signals pertaining the respective channel numbers 1, 2, 3, . . . $n$ arranged in relation to a horizontal time scale. It will be observed that these groups of signals are time staggered each having its left hand end displaced by a time $t_2$ (the delay time per section of the delay line 14) from the preceding group, so that the last group $70_n$ is received at the output end of the delay line by a time $(n-1)t_2$ later than the first group of signals $70_1$.

At the left hand end of each group $70_1$–$70_n$ there is shown in broken lines the preceding groups of signals $69_1$–$69_n$. At the right hand end of each group $70_1$–$70_n$ is shown the succeeding group of signals $71_1$–$71_n$.

The receiver beam will be formed properly only when the signals contained in groups pertaining to the same frequency sweep of the local oscillator 19 and hence to the same scan, overlap with each other in time at the output end of the delay line. This condition is represented by the zone 72 bounded by the broken lines 72*a* and 72*b*.

At all other times only some of the signal groups in a particular set such as $70_1$–$70_n$ combine with each other, those channels which do not offer a proper contribution, may provide instead an improper contribution from a preceding or succeeding sweep of the local oscillator as the case may be.

For example at a time represented by the ordinate T proper contribution is received only from signal groups $70_1$–$70_2$ and improper contribution could occur from signal groups $69_3$–$69_n$.

In practice the signal groups do not exist at all at the end of a delay line unless there is a target from which a signal is reflected, so that unless targets were simultaneously present in both lateral margins of a scanned sector, there would not in fact be improper contribution from a preceding or succeeding set of signal groups, but merely a lack of contribution. However this would result in malformation of the receiver beam.

The limitation discussed above is fundamental to the system, but may be minimised by reducing the delay $t_2$ per section of the delay line 14 in comparison with the lengths of the signal groups.

The former quantity $t_2$ for a given delay line depends on the physical length used, while the latter quantity depends on the duration of one frequency sweep.

In practice the length of delay line used and the frequency sweep depend upon the angular width of the sector to be scanned, increase in both these quantities produces increase in beam reflection up to the theoretical limit.

To avoid distortion from the causes just discussed, it is therefore advantageous to use a delay line which physically is as short as possible, the requisite phase-shift per section is preserved by increasing the frequency sweep.

For practical purposes the time $(n-1)t_2$ may be confined to a value less than $t/n$ per scan, where $t$ is the time occupied in one sweep of the scan (equal to the transmitted pulse length), and $n$ is the number of elements in the antenna array, thus the frequency sweep $\Delta f$ may be determined by the following equations:

$$t_2 \leq \frac{t}{n(n-1)}$$

$$t_2 = \frac{dB}{dw} = \frac{2\pi}{2\pi \cdot \Delta f} = \frac{1}{\Delta f}$$

$$\Delta f \geq \frac{n(n-1)}{t}$$

where B is the phase-shift per section (made equal to $2\pi$).

Under these conditions $(n-1)$ beam widths of undistorted beam shape and deflection per scan will be attained. Since in some cases a reduction of deflection by one half a beam width in either direction may be necessary in order to avoid ambiguity between the main lobe and a secondary lobe, this reduction in the scanned sector is not regarded as serious.

Although the method of the invention and apparatus for performing same have been described with reference to the drawings as applied to high frequency scanning of the beam of the receiving antenna array in a single plane only, for example, a horizontal plane, it will be understodd that the invention may be applied in cases where it is desired to execute a scan in some other mode.

One such mode is designed to provide directional or bearing information in two mutually perpendicular planes, each passing through the reference axis 13 of FIGURE 1.

Figure 24:
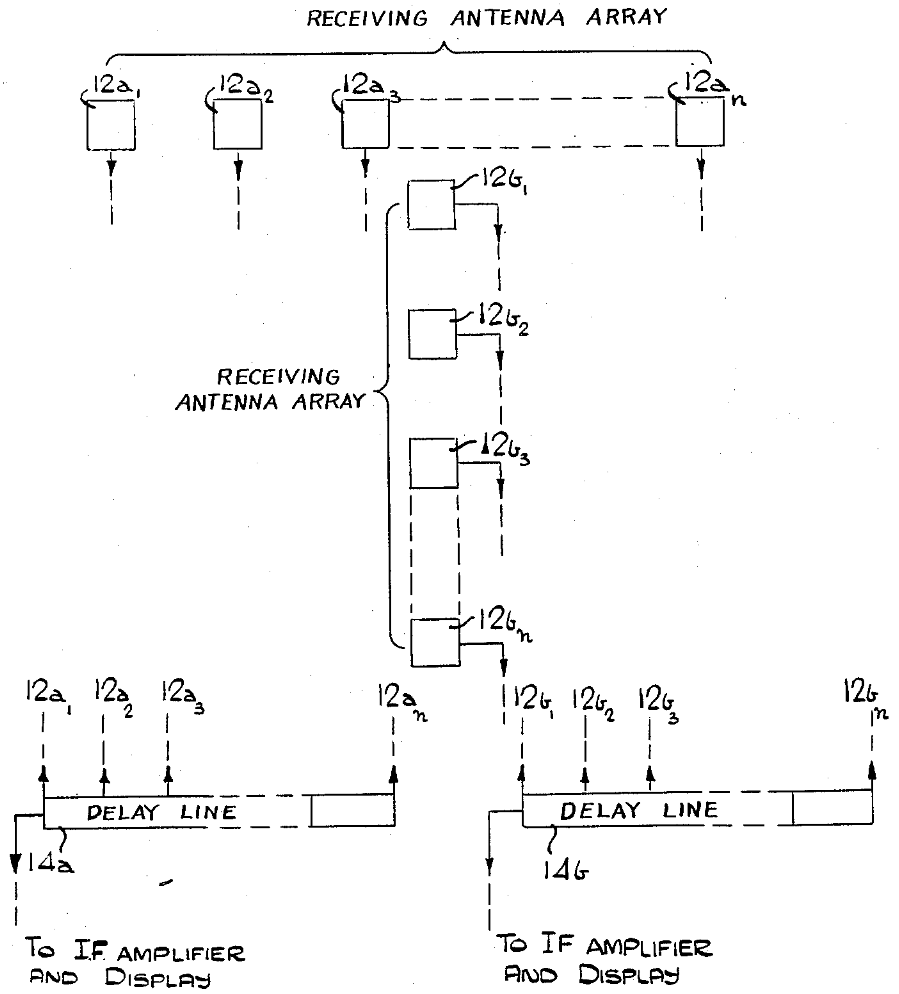
FIGURE 24 is a diagrammatic representation of the receiving antenna array of a position finding radar apparatus providing two beams scanning in mutually perpendicular planes.

An arrangement which can be utilised to perform scanning in this mode is illustrated diagrammatically in FIGURE 24.

Two strip arrays would be provided one comprising antenna elements 12$a_1$–12$a_n$. The other strip array would comprise the antenna elements 12$b_1$–12$b_n$, the lengths of the two strip arrays being perpendicular to each other and conveniently but not essentially the arrays being arranged in T-formation with the apertures of the horns facing towards a common plane.

The elements of the array 12$a_1$–12$a_n$ would be connected through channels as indicated to the tapping points on one delay line 14$a$ while the elements 12$b_1$–12$b_n$ would be connected to the tapping points on the delay line 14$b$ as shown.

The connecting channels in each case would include modulator means and such modulator means would be fed with a locally generated frequency swept signal from an oscillator sweep as 19 in FIGURE 1 which may be common to both sets of antena elements and their associated delay lines.

Outputs may be taken from the ends of the delay lines 14$a$ and 14$b$ through I.F. amplifier, detector, and video amplifiers to two separate display devices such as those illustrated in FIGURE 1, these display devices in effect providing a display which represents a plan view and a side elevation of the solid angle scanned by the two fan shaped beams produced by the respective strip arrays.

A common transmitter may be used in association with each receiver strip array, such transmitter being as shown schematically in FIGURE 1.

Figure 25:
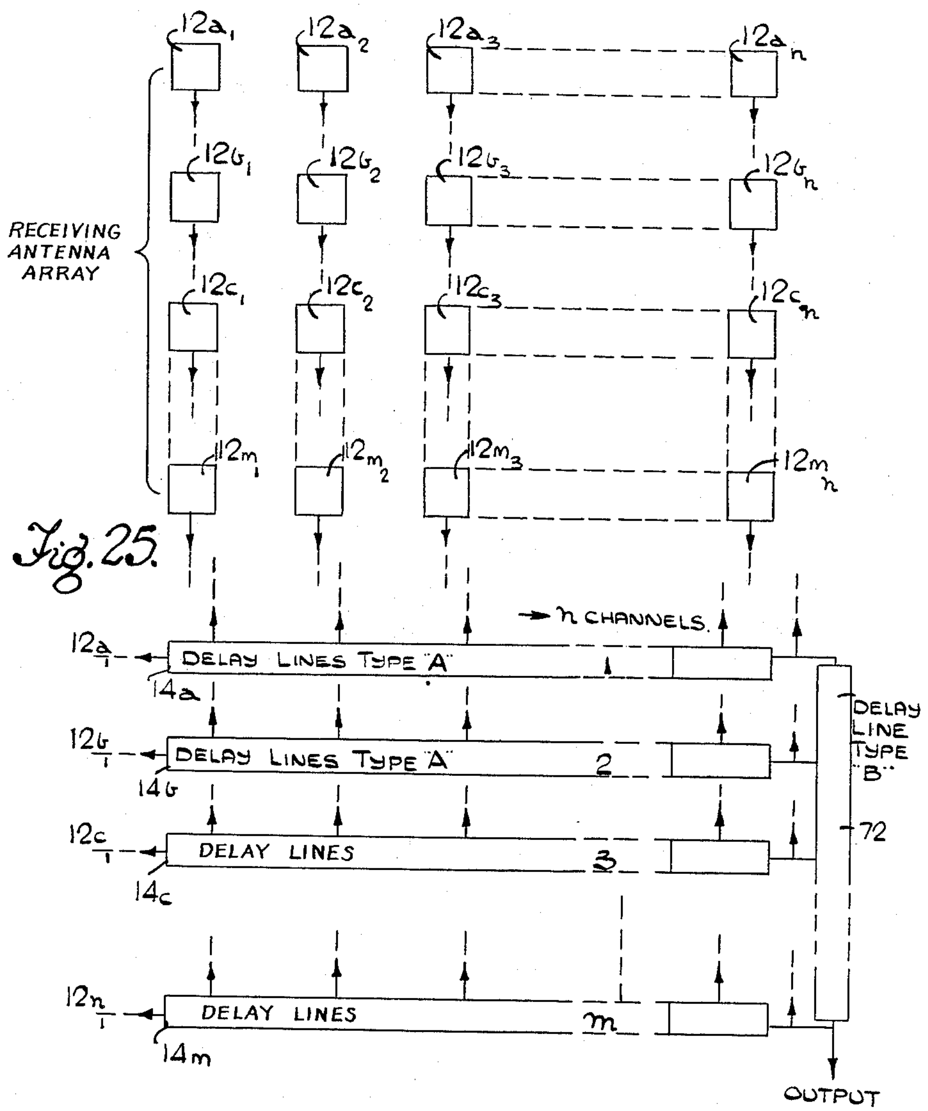
FIGURE 25 is a diagrammatic representation of a delay net for connection to a plurality of generally parallel strip arrays providing for scanning by a pencil-shaped beam of a solid angle of a space to be explored.
Figure 26:
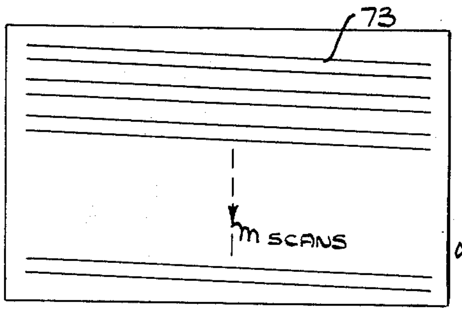
FIGURE 26 is a diagrammatic representation of the manner in which scanning is effected utilising the delay net shown in FIGURE 25.

An alternative arrangement which provides for scanning of a solid angle of a space to be explored by a pencil-shaped beam is illustrated in FIGURES 25 and 26.

In this arrangement a plurality of antenna elements are distributed throughout an area, conveniently rectangular, such antena elements may be of the horn type and may present their apertures towards a common plane.

The antenna elements may be arranged in rows forming respective strip arrays, the elements in one row being designated 12$_a$–12$_n$, the next row designated 12$_b$–12$_{b-n}$ and the $m$th row designated 12$_m$–12$_{m-n}$ as shown.

In association with this array is provided a delay net comprising $m$ delay lines associated with the strip arrays respectively, and each having $n$ tapping points distributed at equal distances along its length for connection to respective antenna elements of its associated strip array.

Output may be taken from one end of this set of delay lines to equi-distant tapping points on a further delay line 72, the output being taken from one end thereof as indicated and fed to I.F. amplifier means, a detector, video amplifier, and display device similar to that provided in FIGURE 1 with certain modifications hereinafter referred to.

The channels to which the respective antenna elements are connected and which in each case lead to the tapping points on the set of delay lines 14$_a$–14$_m$ include modulator means such as already shown and described with reference to FIGURE 1, and a local oscillator such as 19 may feed all these modulator means.

Frequency sweep of the locally generated signal will thus produce deflection in a first plane perpendicular to the plane towards which the antenna elements face due to change in the phase-shift provided along each of the delay lines 14$_a$–14$_m$.

The magnitude of the frequency sweep is made sufficiently great so that when the main beam (which will be of pencil-shape due to the arrangement of the antenna elements) has been deflected from one limit to the other limit of the scan sector, a further beam (previously a side lobe) will appear at the first limit and will scan across the sector in the same direction as that which preceded it.

Thus a succession of such beams are caused to scan wherein directionally across the solid plane in the first plane mentioned.

Deflection of these beams in a second plane which is mutually perpendicular to the first and to that towards which the antena elements face is effected by the change of phase-shift produced along the delay line 72.

The delay line 72 is so designed that, for the frequency-shift will occur between successive beams, these will be deflected in the second plane by one beam width so that the horizontal lines 73 in diagram 26 represent the scanning raster produced by the axis of the pencil-shaped beam in the course of a complete frame scan.

The appropriate modification will require to be made to the display device to present bearing or directional information in two planes as well as range information. This may be done by having two cathode ray tubes as described, in connection with FIGURE 24. Thus one cathode ray tube may have bearing time base means receiving input related to beam deflection in the first plane and range time base, whilst the other cathode ray tube may have a bearing time base receiving input corresponding to scan in the second plane and also a range time base. Signal display may be by spot brightening in both cathode ray tubes.

It will be understood that other forms of display may be utilised such as will be well-known to those having a knowledge of the art.

In the foregoing description with reference to the drawings it has been assumed that the sector to be explored by scanning of the receiver beam will be "illuminated" at uniform field strength in all directions within the sector by utilisation of a transmitter having an antenna array so far as possible, providing a beam shape which will do this.

The design of transmitters using micro wave magnetrons is well understood in the art, but the following publication is mentioned as containing a good disclosure of information on this subject:

"Micro Wave Magnetrons," by Collins, publication in Radiation Laboratory Series No. 6, by McGraw Book Company Incorporated, 1948.

Figure 21:
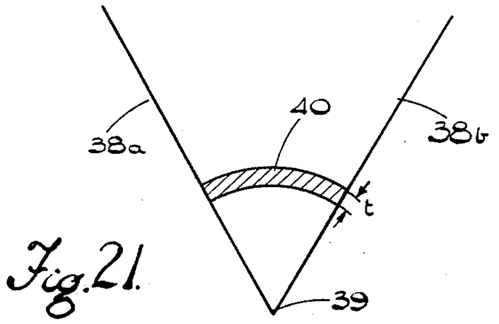
FIGURE 21 is a diagram illustrating a conventional mode of "illuminating" a sector by a pulsed transmitter.

FIGURE 21 illustrates this manner of illumination, the angular boundaries of the sector being indicated at 38*a* and 38*b*, the transmitting aerial being situated at the origin 39, and the part of the sector "illuminated" at a given time after radiation of a transmitted pulse of duration *t* being indicated by the part annular band 40 which is concentric with the origin 39.

Figure 22:
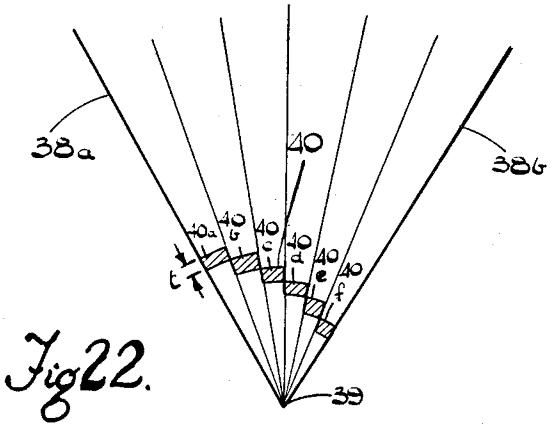
FIGURE 22 is a diagram similar to FIGURE 21 but illustrating "illumination" of the sector by a pulsed transmitter whereof the beam width is narrower than the sector and is scanned step-wise across the sector within the duration of the transmitted pulse.

It is not however, essential to "illuminate" the sector in this manner. FIGURE 22 shows diagrammatically an alternative system. In FIGURE 22 (wherein parts of the diagram corresponding to those of FIGURE 21 are by like numerals of reference) a transmitting antenna array is utilised having a beam width of smaller value than the angular width of the sector, for example ⅙ of this width. In this case the transmitter is arranged to radiate a pulse of duration *t* in each consecutive subsector, the pulses following immediately upon one another so as to provide a band of "illumination" 40 of which the component parts 40*a* to 40*f* collectively present a wave front of staggered or rippled form. In practice it will be apparent that the transmitter radiates a pulse of duration 6*t*, vertical "slices" or "samples" of this pulse being radiated in respective subsectors of the main sector defined by the axes 38*a* and 38*b*.

The mean power transmitted may be unaltered but the peak value may be reduced.

Figure 23:
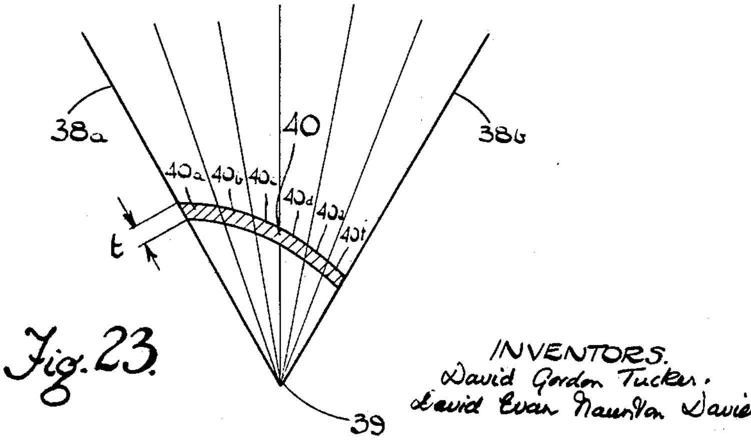
FIGURE 23 is a diagram similar to FIGURE 22 illustrating "illumination" of the sector when the transmitter beam is scanned in a continuous sweep instead of stepwise.

FIGURE 23 represents a further development wherein again corresponding parts of the diagram have been designated by numerals of reference as applied to FIGURE 22. In this case, instead of in effect scanning the beam of the transmitting antenna array stepwise across the sector it is scanned continuously in a time equal to 6*t*.

Scanning in accordance with FIGURE 23 may be effected by a transmitter antenna array incorporating phase-shift elements of ferrite which provide variable phase-shift according to the strength of a magnetic field to which such elements are subjected.

A publication to which reference may be had as to the design of such an array is:

"Microwave Antenna Ferrite Applications," by N. G. Sakeotis, A. J. Semmons and N. H. Chait.

Electronics, volume 25, page 156, June 1952, publication by McGraw-Hill Book Company Incorporated.

In general such antenna may have an aperture from which radiation proceeds and in which a ferrite element is disposed and space parts of this element may be subjected to differing magnetic field strengths to provide the requisite phase-shift, and hence scanning of the transmitter beam.

A possible alternative is to employ non-linear dielectric elements such as a ferro electric dielectric material in the transmitter antenna array subjected to a variable electric field to produce the requisite change of phase-shift.

Figure 19:
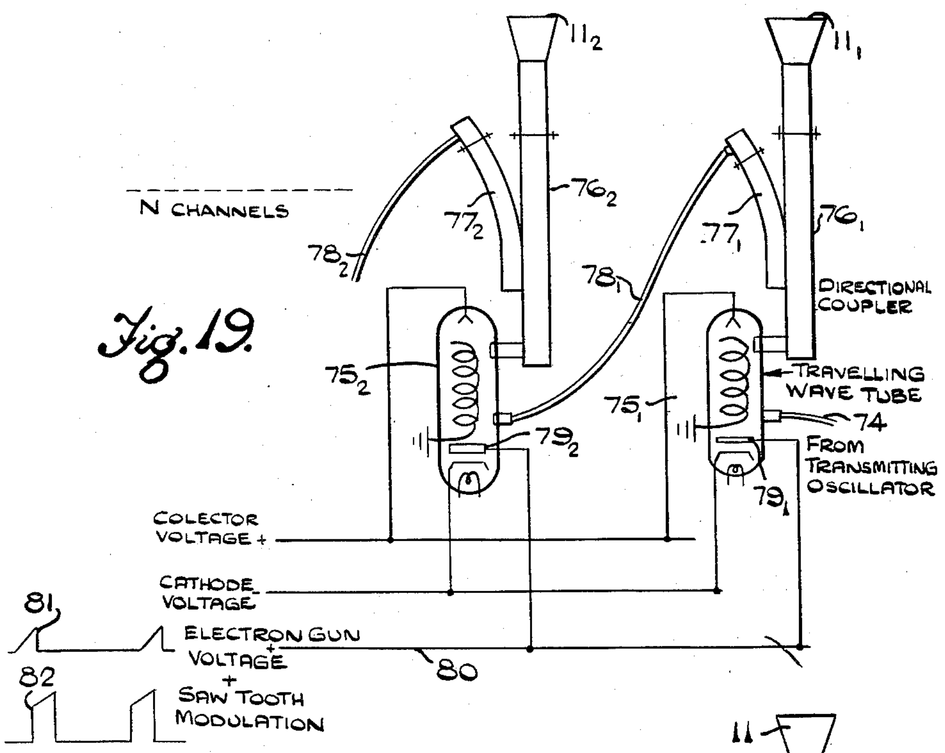
FIGURE 19 is a schematic diagram illustrating one form of transmitter antenna array and feed means therefor producing scanning of the transmitter beam.
Figure 20:
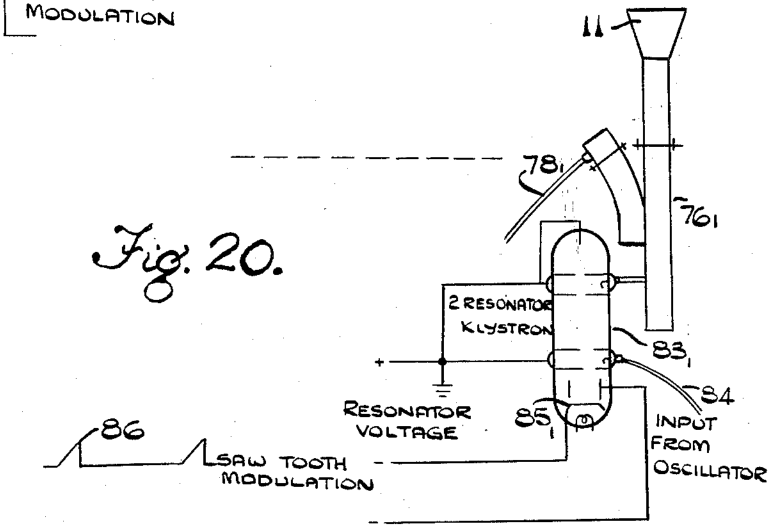
FIGURE 20 is a diagram similar to FIGURE 19 illustrating an alternative form of feed means.

Possible alternatives to this arrangement are illustrated in FIGURES 19 and 20.

In FIGURE 19 the transmitting antenna array comprises elements $\mathbf{11}_1$, $\mathbf{11}_2$, etc. up to $\mathbf{11}_M$ (two only being shown for convenience) these elements being arranged as a strip array having its length lying in the plane of scan.

A transmitting oscillator is utilized which could be a conventional magnetron of medium or low power (owing to the beam gain in the travelling wave tubes or klystrons hereinafter described) and the output from such transmitting oscillator is fed at 74 through a wave guide or cable as appropriate to the channel leading to the first antenna element.

This channel contains a phase-shift element in the form of a travelling wave tube $\mathbf{75}_1$, the output of which is delivered to a wave guide 76, feeding the horn $\mathbf{11}_1$.

Coupling to the corresponding travelling wave tube $\mathbf{75}_2$ in the next channel is provided by a directional coupler $\mathbf{77}_1$ and the cable $\mathbf{78}_1$ so that the travelling wave tubes $\mathbf{75}_1$ to $\mathbf{75}_N$ form phase-shift elements connected effectively in cascade, with the wave guides $\mathbf{76}_1$ to $\mathbf{76}_N$ connected to tapping points.

This produces a phase-shift along the strip array.

Variation of the phase-shift produced by each travelling wave tube is effected by applying a saw-toothed voltage to the electron gun electrode $\mathbf{79}_1$ to $\mathbf{79}_M$.

Such voltage is applied to the line 80 and as indicated may be either a simple saw-tooth as shown at 81 (where the output from the magnetron is already pulsed) or a saw-tooth superimposed on a square pulse as seen at 82 where the output from the magnetron is continuous and requires to be modulated to achieve pulsed radiation.

The pulsing of the travelling wave tubes (which act as amplifiers) has the advantage that there is no distortion due to time staggering (stepped wave fronts) as has already been discussed in relation to the antenna, the electrical length of the coupling cables $\mathbf{78}_1$ to $\mathbf{78}_N$ is such that the horns $\mathbf{11}_1$ to $\mathbf{11}_N$ are fed in phase before the modulated signal 81 or 82 is applied.

The operation of travelling wave tubes as micro-wave phase modulators and frequency shifters, has been disclosed in a paper entitled: "The Travelling Wave Tube as a Microwave Modulator and Frequency Shifter," by W. B. Brown in the Proceedings of the Institution of Electrical Engineers, volume 99, part III, page 15, January 1952, to which reference may be had for a fuller explanation as to the manner of operation.

Travelling wave tubes may be employed to provide high power outputs driven from a low or medium power magnetron (e.g. one kilowatt). It is known that these systems can provide powers of several megawatts and disclosures of such devices have been made in the following papers:

"Air Ministry Type Pulsed Amplifier," by O. Dochler, A. Dubois, and D. Maillart, Proceedings of the Institution of the Electrical Engineers, volume 105B, supplement 10 to 12.

"A Twenty Kilowatt Pulsed Travelling Wave Tube," by J. B. Pearson and H. S. Cockcroft, Proceedings of the Institution of Electrical Engineers, volume 105B, supplement 10 to 12.

In the system shown in FIGURE 20 a double resonator klystron $\mathbf{83}_1$ is substituted for the travelling wave tube $\mathbf{75}_1$, the input from the oscillator being fed in by the cable 84 and saw-tooth modulation being applied to the electron gun electrode $\mathbf{85}_1$ from a saw-tooth modulator providing an output as indicated at 86.

An amplified and phase-shifted signal is fed to the wave guide $\mathbf{71}_1$ and coupling to the next channel is effected through a cable $\mathbf{78}_1$ in the manner already described in FIGURE 19.

It will be appreciated that by utilising a modulating wave form of stepped form instead of saw-toothed form scanning in accordance with the diagram shown in FIGURE 22 may be achieved.

When utilising the systems illustrated in FIGURES 22 and 23 some modification of the receiving display will be required. This can be contrived quite simply by feeding a correcting signal to the range scan deflection plates or coils to compensate for the delay which will apply to the reception of a reflected signal from a target in any one of the subsectors 40*b* to 40*f*, it being appreciated that the range time base will have been synchronized with the signal radiated in the subsector 40*a*.

The correcting signal may be derived from the bearing time base circuit since the value of this signal will be a function of the angular deflection from the boundary axis 38*a*.

What we claim then is:

1. In a radar apparatus including a transmitter for emitting a series of time-spaced radio pulses through a target containing medium, a receiver having a beam-forming antenna array incorporating spaced apart antenna elements connected with respective signal channels, a display device having co-related time base means defining co-ordinates of a sector of the medium to be explored, and amplifier means wherein signals in said channels are combined and fed to said display device; the provision of scanning means for the beam of said receiver antenna array comprising in combination, means for generating a local electrical signal, modulator means in each of said channels connected operatively with said generating means and fed with said local signal to modulate incoming signals in said channels respectively, phase-shift elements operatively connected with said channels and so co-relating the relative phases of the modulated signals therein as to determine the position of the beam of said receiver antenna array in relation to a reference axis thereof, said phase-shift elements being responsive to variation of said local signal, to vary differentially and in co-ordinated relation the respective phase-shifts imparted to said modulated signals and so deflect said beam in relation to said reference axis, and means for repeatedly varying said local signal within a time interval equal to that of said pulses, to cause said beam to scan a sector at least once within said time interval.

2. In a radar apparatus as set forth in claim 1 scanning means as therein claimed, wherein the phase-shift elements afford phase-shifts variable progressively in magnitude as a function of frequency, the means for generating a local electrical signal is a local oscillator producing an output of a frequency differing from the carrier frequency of the incoming signals in said channels, and said local oscillator includes means for cyclically varying the frequency of said output within a time interval equal to that of said pulses.

3. In a radar apparatus as set forth in claim 1 scanning means as therein claimed, wherein the phase-shift elements are connected in the signal channels respectively between the modulator means and the amplifier means.

4. In a radar apparatus as set forth in claim 1 scanning means as therein claimed, wherein the phase-shift elements afford phase-shifts variable progressively in magnitude as a function of frequency, the means for generating a local electrical signal is a local oscillator producing an output of a frequency differing from the carrier frequency of the incoming signals in said channels, and said local oscillator includes means for cyclically varying the frequency of said output over a range which is sufficiently large to reduce for a given phase-shift in said phase-shift elements, the time delay between incidence of respective signals at said amplifier means to a small proportion of said time interval, whereby distortion of beam form or position at extremes of the scanned sector is reduced.

5. In a radar apparatus as set forth in claim 1 scanning means as therein claimed, wherein the phase-shift elements are sections of a delay line which is responsive to change of the frequency of signals passing therethrough to impose phase-shift thereon of a magnitude dependent upon both the length of the line traversed and the range of the frequency sweep, said channels being connected to said delay line at positions spaced apart lengthwise thereof, and said amplifier means being connected to one end at least of said delay line, and wherein the means for generating a local electrical signal is a local oscillator producing an output of a frequency differing from the carrier frequency of the incoming signals in said channels, and said local oscillator includes means for cyclically varying the frequency of said output within a time interval equal to that of said pulses.

6. In a radar apparatus as set forth in claim 1 scanning means as therein claimed, wherein the phase-shift elements are sections of a delay line which is responsive to change of the frequency of signals passing therethrough to impose phase-shift thereon of a magnitude dependent upon both the length of the line traversed and the range of the frequency sweep, said channels being connected to said delay line at positions spaced apart lengthwise thereof, and wherein said amplifier means is connected to one end of the delay line, the means for generating a local electrical signal is a local oscillator producing an output of a frequency differing from the carrier frequency of the incoming signals in said channels, and said local oscillator includes means for cyclically varying the frequency of said output within a time interval equal to that of said pulses, and wherein compensating phase-shift means is included in each of said channels providing values of phase-shift to compensate for distortion of beam form or position due to phase-shifts produced in said delay line otherwise than as a function of local generator frequency but effective upon each signal as a function of the number of delay line sections traversed thereby.

7. In a radar apparatus as set forth in claim 1 scanning means as therein claimed, wherein the phase-shift elements are sections of a delay line which is responsive to change of the frequency of signals passing therethrough to impose phase-shift thereon of a magnitude dependent upon both the length of the line traversed and the range of the frequency sweep, said channels being connected to said delay line at positions spaced apart lengthwise thereof, and wherein said amplifier means is connected to one end of the delay line, and wherein compensating delay units are included in each of said signal channels, providing values of pulse envelope delay to compensate for distortion of beam form or position due to time-staggered reception of the pulse envelopes of the signals from respective channels at the output end of the delay line.

8. In a radar apparatus as set forth in claim 1 scanning means as therein claimed, wherein the phase-shift elements afford phase-shifts variable progressively in magnitude as a function of frequency, the means for generating a local electrical signal is a local oscillator producing an output of a frequency differing from the carrier frequency of the incoming signals in said channels, said channels include means for attenuating signal components of other than the difference frequency between the carrier frequency of the incoming signals and the frequency of the locally generated signal, and wherein said local oscillator includes means for cyclically varying the frequency of said output within a time interval equal to that of said pulses.

9. In a radar apparatus as set forth in claim 1 scanning means as therein claimed, wherein the phase-shift elements have phase-shift characteristics variable as a function of frequency, the means for generating a local electrical signal is a local oscillator producing an output of a frequency differing from the carrier frequency of the incoming signals in said channels, and said local oscillator includes means for cyclically varying the frequency of said output within a time interval equal to that of said pulses, and wherein said local oscillator is connected with said channels through feeder means including branches of equal lengths for the channels respectively, so that the local signals incident at the modulator means of respective channels are in phase with each other irrespective of the instantaneous value of frequency of the local signal.

10. In radar apparatus including a transmitter for emitting a series of time-spaced radio pulses through a target containing medium, a receiver including amplifier means feeding a display device having co-related time base means defining co-ordinates of a sector of the medium to be explored; the provision, in combination, of a beam forming receiver antenna array including a plurality of antenna elements disposed in strip array in closely spaced positions, signal channels connecting said elements respectively with a delay line at tapping points spaced apart along it, said delay line having a phase-shift characteristic variable as a function of frequency and a phase-shift between successive tapping points exceeding that corresponding to the lateral spacing between successive antenna elements, means for generating a local electrical signal, modulator means in each of said channels connected operatively with said generating means and fed with said local signal to modulate incoming signals in said channels respectively, and means for varying the frequency of said local signal to vary differentially and in co-ordinated relation the respective phase-shifts imparted to said modulated signals incident at an output end of said delay line, and hence to produce scanning of the beam established by said antenna array.

11. In a radar apparatus including a receiver having a beam-forming antenna array incorporating spaced apart antenna elements connected with respective signal channels, a display device having co-related time base means defining co-ordinates of a sector of the medium to be explored, and amplifier means wherein signals in said channels are combined and fed to said display device; the combination of a transmitter including means for generating a time-spaced series of radio pulses, and having an antenna affording a transmitter beam width of a predetermined angular value, means for scanning said transmitter beam through a sector subtending an angle a plurality of times greater than said beam width at least once within the duration of each transmitted pulse, and means for scanning said receiver beam through said sector within a time interval equal to the transmitted pulse duration divided by the number of transmitter beam widths in said sector.

12. In a radar apparatus including a receiver having a beam-forming antenna array incorporating spaced apart antenna elements connected with respective signal channels, a display device having co-related time base means defining co-ordinates of a sector of the medium to be explored, and amplifier means wherein signals in said channels are combined and fed to said display device; the provision of a transmitter including means for generating a time-spaced series of radio pulses, a transmitter antenna array including laterally spaced transmitter antenna array elements to form a transmitter beam, transmitter feeder channels connecting said generating means with said array elements; phase-shift elements in said feeder channels determining the position of said transmitter beam in relation to a reference axis of the transmitter antenna array, means periodically activating said phase-shift elements to vary in co-ordinated relation the phase-shifts produced thereby and thus to cause said transmitter beam to scan a sector of an angular width a plurality of times greater than the angular width of said beam itself, and at least once within the duration of each transmitted pulse, and means for scanning said receiver beam through said sector within a time interval equal to the transmitted pulse duration divided by the number of transmitter beam widths in said sector.

13. In a radar apparatus including a receiver having a beam-forming antenna array incorporating spaced apart antenna elements connected with respective signal channels, a display device having co-related time base means defining co-ordinates of a sector of the medium to be explored, and amplifier means wherein signals in said channels are combined and fed to said display device the provision of; a transmitter including means for generating a time-spaced series of radio pulses, a transmitter antenna array including laterally spaced transmitter antenna array elements to form a transmitter beam, transmitter feeder channels connecting said generating means with said array elements, phase-shift elements in said feeder channels comprising velocity modulated tubes connected in cascade with said generating means and respectively with said transmitter antenna elements to provide progressively increasing phase-shift along the transmitter array, said tubes having electrode means responsive to the application of a variable voltage to velocity modulate an electron stream conveying the generated pulses, means for generating a local signal varying cyclically within the duration of each transmitted pulse, means for applying said local signal to said electrode means to vary the phase-shifts produced by said tubes and cause the transmitter beam to scan a sector of an angular width a plurality of times greater than the angular width of said beam itself and at least once within the duration of each transmitted pulse, and means for scanning said receiver beam through said sector within a time interval equal to the transmitted pulse duration divided by the number of transmitter beam widths in said sector.

14. In a radar apparatus including a receiver having a beam-forming antenna array incorporating spaced apart antenna elements connected with respective signal channels, a display device having co-related time base means defining co-ordinates of a sector of the medium to be explored, and amplifier means wherein signals in said channels are combined and fed to said display device; the provision of a transmitter including means for generating a time-spaced series of radio pulses, a transmitter antenna array including laterally spaced transmitter antenna array elements to form a transmitter beam, transmitter feeder channels connecting said generating means with said array elements, phase-shift elements in said feeder channels determining the position of said transmitter beam in relation to a reference axis of the transmitter antenna array, means periodically activating said phase-shift elements to vary in co-ordinated relation the phase-shifts produced thereby and thus to cause said transmitter beam to scan a sector of an angular width a plurality of times greater than the angular width of said beam itself and at least once within the duration of each transmited pulse, and, scanning means for the beam of said receiver antenna array comprising means for generating a local electrical signal, modulator means in each of said channels connected operatively with said generating means and fed with said local signal to modulate incoming signals in said channels respectively, phase-shift elements operatively connected with said channels and so co-relating the relative phases of the modulated signals therein as to determine the position of the beam of said receiver antenna array in relation to a reference axis thereof, said phase-shift elements being responsive to variation of said local signal, to vary differentially and in co-ordinated relation the respective phase-shifts imparted to said modulated signals and so deflect said beam in relation to said reference axis, and means for repeatedly varying said local signal within a time interval equal to the transmitted pulse duration divided by the number of transmitter beam widths in said sector.

15. A radio transmitter for emitting a radio pulse to a space sector providing irradiation thereof in a zone extending continuously between the lateral boundaries thereof, and bounded by leading and trailing wave fronts travelling outwards in said section in predetermined time-spaced relation, such transmitter comprising a transmitter antenna array including an outlet extending laterally of said sector and providing a beam having a width less than that of said sector, means for generating pulses of radio energy, feeder means connected operatively between said outlet and said generator means and including channels serving laterally spaced parts of said outlet, means for generating an activating signal, phase-shift elements connected operatively with said channels and to the last said means, and responsive thereto to provide phase-shifts of magnitude dependent upon the value of said activating signal, and means for varying said value in a time which is a sub-division of the generated pulse duration, to produce co-ordinated phase-shift as between components of said pulse fed to said laterally spaced parts of said aperture, and angular scan of said beam through a plurality of beam-widths within said pulse duration.

16. A radio transmitter for emitting a radio pulse to a space sector providing irradiation thereof in a zone extending continuously between the lateral boundaries thereof, and bounded by leading and trailing wave fronts travelling outwards in said section in predetermined time-spaced relation, such transmitter comprising a transmitter antenna array including a plurality of antenna elements spaced apart in a plane extending laterally of said sector and providing a beam having a width less than that of said sector, means for generating pulses of radio energy, feeder means including a plurality of channels connecting said generator means to said antenna elements respectively, phase-shift elements included in said channels respectively, and providing phase-shifts so co-relating the phases of pulse components fed to said antenna elements as to determine the direction of said beam, means for generating an activating signal varying cyclically within the duration of each pulse and for feeding some to said phase-shift elements to modify their conditions of operation, and vary in co-ordinated relation the magnitude of the phase-shift imparted by said phase-shift element to components of said pulse fed along said channels within said duration, and thereby produce angular scan of said beam through a plurality of beam-widths within said pulse duration.

17. In a radar apparatus including a transmitter for emitting a series of time-spaced radio pulses through a target containing medium, a receiver including amplifier means feeding a display device having co-related time base means defining co-ordinates of a section of the medium to be explored; the provision in combination of a beam forming receiver antenna including a plurality of antennna elements disposed at positions spaced apart in each of two mutually transverse directions and directed towards a plane, signal channels connecting said elements with said amplifier means, means for generating a local electrical signal, modulator means in each of said channels connected operatively with said generating means and fed with said local signal to modulate incoming signals in said channels respectively, phase-shift elements operatively connected with said channels and so co-relating the relative phases of the modulated signals therein as to determine the position of the beam of said receiver antenna array in relation to a reference axis thereof, said phase-shift elements being responsive to variation of said local signals, to vary differentially and in co-ordinated relation the respective phase shifts imparted to said modulated signals and so deflect said beam in relation to said reference axis, and means repeatedly varying said local signal within a time interval equal to that of said pulses to cause said beam to scan in said two transverse directions, and explore a solid angle subtended at the intersection of said reference axis and plane.

18. In a radar apparatus including a transmitter for emitting a series of time-spaced radio pulses through a target containing medium, a receiver including amplifier means feeding a display device having co-related time base means defining co-ordinates of a sector of the medium to be explored; the provision in combination of a beam forming receiver antenna including a plurality of antenna elements arranged to form at least two strip arrays extending in mutually transverse directions towards a plane and providing two generally fan-shaped beams, signal channels connecting said elements with said amplifier beams, means for generating a local electrical signal, modulator means in each of said channels connected operatively with said generating means and fed with said local signal to modulate incoming signals in said channels respectively, phase-shift elements operatively connected with said channels and so co-relating the relative phases of the modulated signals therein as to determine the position of the beams of said receiver antenna arrays in relation to a reference axis thereof, said phase-shift elements being responsive to variation of said local signal to vary differentially and in co-ordinated relation the respective phase-shifts imparted to said modulated signal and so deflect said beams in directions generally perpendicular to their respective planes and in relation to said reference axis so that collectively said beams explore a solid angle subtended at the intersection of said reference axis and plane.

19. In a radar apparatus including a transmitter for emitting a series of time-spaced radio pulses through a target containing medium, a receiver including amplifier means feeding a display device having co-related time base means, defining co-ordinates of a sector of the medium to be explored; the provision in combination of a beam forming receiver antenna including a plurality of antenna elements arranged to form a plurality of strip arrays having their lengths disposed generally parallel with each other, said antenna elements being directed towards a plane, a delay net including a set of delay lines responsive to change in frequency of signal passing therethrough to impose thereon a phase-shift of a magnitude dependent upon the frequency of the signal carrier, a plurality of signal channels connecting the antenna element of each strip array with respective tapping points spaced apart along a respective one of said delay lines, at least one further delay line also responsive as aforesaid included in said net and having tapping points spaced apart along its length and connected to respective outlets of said set in delay lines, a local oscillator providing a local signal of frequency different from the carrier frequency of said signals, modulator means in each of said channels connected operatively with said channels and with said local oscillator to modulate incoming signals in said channels respectively, means for repeatedly varying the frequency of said local signal to produce like variation of phase-shift along said set of delay lines, and a smaller variation of phase-shift along said further delay line, the range of frequency variation being such as to produce scanning of the receiver beam through a sector in a first plane generally perpendicular to said plane due to phase-shift variation in said further delay line and, concomitantly scanning the beam in second plane through a sector generally perpendicular to the first plane and to said plane due to phase-shift variation in said set of delay lines, scanning in said second plane occurring unidirectionally through the establishment and angular displacement of successive polar lobes of the polar diagram.

20. In a radar apparatus including a transmitter for emitting a series of time-spaced radio pulses through a target containing medium, a receiver having beam-forming antenna array incorporating spaced apart antenna elements connected with respective signal channels, a display device having co-related time base means, defining co-ordinates of a sector of the medium to be explored, and amplifier means wherein signals in said channels are combined and fed to said display device; the provision of scanning means for the beam of said receiver antenna array comprising in combination, means for generating a local electrical signal, modulator means in each of said channels connected operatively with said generating means and fed with said local signal to modulate incoming signals in said channels respectively, a delay line responsive to change in said local signal to provide change of phase-shift in signals passing through it, said delay line having tapping points spaced apart along its length and connected respectively to said signal channels, said delay line having outlets at opposite ends connected with said amplifier means, and means for repeatedly varying said local signal to vary differentially and in co-ordinated relation the respective phase-shifts imparted to said modulated signals and so deflect said beam in relation to said reference axis, and simultaneously in opposite directions as seen from said delay line outlets respectively, and means for displaying or combining the signals at said outlets in said display device.

21. Scanning means for a radio beam comprising, a beam forming antenna array including a plurality of spaced apart antenna elements, a plurality of channels connected respectively thereto, a plurality of phase-shift elements connected in cascade with each other to provide tapping points connected respectively to said channels, said phase-shift element further having outlets at positions spaced apart lengthwise of the cascaded series and effective to produce respective receiver beams, means for activating said phase-shift elements to vary in co-ordination the magnitude of the phase-shift produced by each of them and to cause said respective beams to execute individual scanning of a sector.

22. In a radar apparatus including (*a*) a transmitter for emitting a modulated radio carrier signal through a target containing medium, (*b*) a receiver including amplifier means feeding a display device having co-related time base means defining co-ordinates of a sector of the medium to be explored, (*c*) the provision in combination (*d*) of a beam-forming receiver antenna array including laterally spaced apart antenna elements for receiving an incoming signal of substantially fixed carrier frequency, (*e*) signal channels connecting said antenna elements respectively with said amplifier means, (*f*) local oscillator means for generating a local signal of a frequency differing from the carrier frequency of the incoming signal, (*g*) modulator means in each of said channels connected operatively with said generating means and fed with said local signal to modulate incoming signals in said channels respectively, (*h*) phase-shift elements affording phase-shift variable progressively in magnitude as a function of frequency operatively connected with said channels and establishing phase-shifts therein differing as between successive channels by an amount exceeding that corresponding to the lateral separation of the antenna elements, (*i*) said phase-shift elements co-relating the relative phases of the modulated signals in said channels to determine the position of the beam of said receiver antenna array in relation to a reference axis thereof, (*j*) means for varying cyclically the frequency of said local signal whereby said phase-shift elements vary differentially and in co-ordinated relation the respective phase-shifts imparted to said modulated signals, said cyclic variation occurring within a time interval represented by the reciprocal of that band width which accommodates the emitted modulated signal, to produce scanning of said beam within this interval.

23. In a radar apparatus including (*a*) a transmitter for emittin ga modulated radio carrier signal through a target containing medium, (*b*) a receiver having a beam-forming antenna array incorporating spaced apart antenna elements connected with respective receiver signal channels, (*c*) a display device having co-related time base means defining co-ordinates of a sector of the medium to be explored, (*d*) and amplifier means wherein received signals in said channels are combined and fed to said display device, (*e*) the provision of scanning means for the beam of said receiver antenna array, (*f*) comprising in combination, (*g*) means for generating a local electrical signal, (*h*) modulator means in each of said channels, (*i*) said modulator means being operatively connected with said generating means and fed with said local signal to modulate said received signals in said channels respectively, (*j*) phase-shift elements operatively connected with said channels and so co-relating the relative phases of the modulated signals therein as to determine the position of the beam of said receiver antenna array in relation to a reference axis thereof, (*k*) said phase-shift elements being responsive to said local signal to vary differentially and in co-ordinated relation the respective phase-shifts imparted to said modulated signals and so deflect said beam in relation to said reference axis, (*l*) and means for repeatedly varying said local signal within a time represented by the reciprocal of that band width accommodating the emitted modulated signal.

References Cited in the file of this patent

UNITED STATES PATENTS

| | | |
|---|---|---|
| 2,407,169 | Loughren | Sept. 3, 1946 |
| 2,426,460 | Lewis | Aug. 26, 1947 |